United States Patent
McAdoo et al.

(10) Patent No.: US 10,022,632 B1
(45) Date of Patent: Jul. 17, 2018

(54) ONLINE COMPUTER GAME SYSTEMS AND METHODS FOR FACILITATING FINANCIAL INVESTMENT

(71) Applicants: Alexander McAdoo, Las Vegas, NV (US); Matthew Nemec, Waco, TX (US)

(72) Inventors: Alexander McAdoo, Las Vegas, NV (US); Matthew Nemec, Waco, TX (US)

(*) Notice: Subject to any disclaimer, the term of this patent is extended or adjusted under 35 U.S.C. 154(b) by 39 days.

(21) Appl. No.: 15/072,344

(22) Filed: Mar. 16, 2016

Related U.S. Application Data

(60) Provisional application No. 62/198,619, filed on Jul. 29, 2015, provisional application No. 62/163,598, filed on May 19, 2015.

(51) Int. Cl.
| | | |
|---|---|---|
| A63F 9/24 | (2006.01) | |
| A63F 13/792 | (2014.01) | |
| A63F 13/35 | (2014.01) | |
| A63F 13/537 | (2014.01) | |

(52) U.S. Cl.
CPC ............ *A63F 13/792* (2014.09); *A63F 13/35* (2014.09); *A63F 13/537* (2014.09)

(58) Field of Classification Search
CPC ................ A63F 13/792; A63F 2300/5513
See application file for complete search history.

(56) References Cited

U.S. PATENT DOCUMENTS

| | | |
|---|---|---|
| 6,729,884 B1 | 5/2004 | Kelton |
| 6,993,572 B2 | 1/2006 | Ross, Jr. |
| 8,849,701 B2 | 9/2014 | Willis |
| 9,155,965 B2 | 10/2015 | Wickett |
| 9,174,128 B2 | 11/2015 | Guthridge |
| 9,186,582 B2 | 11/2015 | Janis |
| 2001/0027430 A1* | 10/2001 | Sabourian ............ G06Q 30/02 705/35 |
| 2003/0104857 A1 | 6/2003 | Jenkins |
| 2006/0105840 A1* | 5/2006 | Graeve ............... A63F 3/00157 463/42 |
| 2007/0078737 A1* | 4/2007 | Jung ..................... G06Q 30/02 705/35 |
| 2007/0087819 A1* | 4/2007 | Van Luchene .......... G07F 17/32 463/25 |
| 2007/0105630 A1* | 5/2007 | Van Luchene ......... G06Q 30/04 463/42 |
| 2007/0111770 A1* | 5/2007 | Van Luchene .......... A63F 13/12 463/7 |
| 2007/0167219 A1 | 7/2007 | Groz |

(Continued)

FOREIGN PATENT DOCUMENTS

| | | |
|---|---|---|
| WO | WO 2015/042494 | 3/2015 |

OTHER PUBLICATIONS

PLANETCALYPSO; Planetcalypso—Investments; www.planetcalypso.com/opportunities/.

(Continued)

*Primary Examiner* — Steve Rowland
(74) *Attorney, Agent, or Firm* — Heisler & Associate

(57) ABSTRACT

A computer game system in which real-world financial investment by the player of the computer game is incentivized, and such real-world financial investment is realized as a secondary benefit of game play.

15 Claims, 13 Drawing Sheets

(56) References Cited

U.S. PATENT DOCUMENTS

| | | |
|---|---|---|
| 2007/0203725 A1* | 8/2007 | Jung .................. G06Q 40/02 |
| | | 705/39 |
| 2009/0181777 A1 | 7/2009 | Christiani |
| 2013/0097060 A1 | 4/2013 | Taylor |
| 2013/0191194 A1 | 7/2013 | Shreibati |
| 2013/0332388 A1 | 12/2013 | Martell |
| 2014/0075004 A1 | 3/2014 | Van Dusen |
| 2014/0370972 A1 | 12/2014 | Mullen |
| 2015/0017611 A1 | 1/2015 | Moumneh |
| 2015/0037771 A1 | 2/2015 | Kaleal, III |

OTHER PUBLICATIONS

Dan Pearson; WoW to Allow Players to Buy Play Time with In-Game Currency; www.gamesindustry.biz/articles/2015-03-03-wow-to-allow-players-to-buy-play-time-with-in-game-currency.

* cited by examiner

ONLINE COMPUTER GAME SYSTEMS AND METHODS FOR FACILITATING FINANCIAL INVESTMENT

This application claims the benefit of U.S. Provisional Application No. 62/198,619, filed Jul. 29, 2015, and U.S. Provisional Application No. 62/163,598, filed May 19, 2015.

FIELD OF THE INVENTION

The invention relates to online interactive computer games and more particularly to online computer game systems and methods for facilitating real-world financial investment by garners who play online computer games as a secondary benefit of their game play.

BACKGROUND

In recent times, online computer gaming involving the playing of interactive computer games, including online computer games played over wide area computer networks such as the Internet, has become extremely popular. It is believed that more than a billion individuals worldwide have played such interactive online computer games at some point. In the United States alone, it is estimated that well over a hundred million people have been involved in computer gaming, including the playing of online interactive computer games. Such computer gaming, including but not limited to, the playing of interactive online computer games over the Internet, takes many different forms, spanning from a simple computer game in which an individual player (also referred to herein as a "gamer") plays a single-player computer game on the player's cell phone, to massively multi-player online games ("MMOG") in which a large number of gainers located in a plurality of geographical locations may access and play an online interactive computer game at the same time over a wide area network, such as the Internet, and may interact with each other in the virtual world of the computer game through the movements and actions of their own player characters (also referred to as "avatars") that exist within the virtual world of the computer game.

For millions of people throughout the world, computer gaming is a routine manner of diversion involving daily or weekly game play. Most of the individuals who play online computer games (referred to interchangeably herein as "garners" or "players") are initially required by the software of the online computer games to create game play accounts (also called "game accounts") prior to initially accessing and playing the online computer game, and these game play accounts are also used to gain access to, and play, the online computer game in subsequent game sessions. Many online computer games requiring the creation of a game play account prior to accessing and playing the online computer games also require payment of real world financial consideration on a subscription basis in order to maintain the game play accounts in good standing so that the garners can continue to access and play the online computer game through the game play accounts. In other words, recurring payments of real world funds are typically required in exchange for a player's continuing ability to access and play the online computer game over time using his or her game play account. These subscription payments are typically, though not universally, paid on a monthly basis by cash, credit, or debit transactions, with such real-world financial consideration being paid by a gamer in exchange for the continued ability to access and play the online computer game.

In other instances, access and the ability to play online computer games is free or is available after payment of a small initial purchase fee, but certain virtual items known as "in-game items" that are created by operation or function of the game software and that exist only within the virtual world of the computer game, for example special powers, abilities, attributes, characteristics, weapons, shields, skins, spells, magic potions, mounts, coins, currency, gems, treasure, food, seeds, animals, houses, building materials, machines, or articles of clothing, can be acquired and used by a player's in-game player character (the terms "player character" and avatar" are used interchangeably herein) within the virtual world of the computer game in exchange for the payment of real-world funds. Again, such payments of real-world financial consideration may be handled through cash, credit, or debit transactions, with such payments being required for the garners' avatars' acquisition and ability to use the in-game items in the virtual world of the computer game. In other words, in this type of online game, a player will be presented with opportunities for his or her player character to acquire and use an in-game item in the virtual world of the online computer game, but in order for the player character to obtain the in-game item in the virtual world of the computer game, the player will be required to pay some amount of real world funds for the acquisition of that in-game item.

Playing computer games, including online interactive computer games, offers many positive personal, social, and health benefits such as entertainment, relaxation, stress-relief, education, socialization, development of hand-eye coordination, and in certain instances, physical exercise. Many gamers are healthy, well-adjusted individuals who enjoy taking on various fantasy roles within the virtual world of a computer game through one or more player characters/avatars that exist in the virtual world of the computer game, each of which player characters/avatars can be thought of as a virtual representation of the gamer. In some instances, a gamer's avatar can be customized or personalized by the gamer with certain characteristics, abilities, strengths, personal attributes, clothing, skins, or physical appearances that are chosen by the gamer in order to personalize or customize the gamer's avatar. In other computer games, a player's player character is not customizable, but nevertheless can still be thought of as an in-game representation of the player within the virtual world of the online computer game. Many garners participate in online communities composed of multiple other garners, some or all of whom are able to interact with each other through the virtual interactions of their in-game avatars that occur during game play within the virtual world of an online computer game. Game play often involves the interaction of various players' avatars with each other and with the virtual elements and features of the virtual world of the computer game. Game play also often involves completion of various virtual activities and in-game challenges that are virtual tasks, quests, missions, or other similar in-game challenges to be completed by the gamer's avatar in the virtual world of the game such as overcoming obstacles, winning virtual combat with in-game opponents or other players' avatars, destroying an opponent or target in a first-person shooter game, solving puzzles or riddles, finding hidden in-game items that unlock gates or provide access to previously barred or hidden areas, completing certain requirements for leveling-up to other levels or other playscapes within the virtual world of the game, collecting certain in-game items, raising crops or livestock, building houses, castles, walls or other structures, mating, eating food and drink, purchasing in-game items, mining for precious materials, and many other virtual tasks, quests and activities that may be completed by the gamer's avatar in the virtual world of the game. Thus, playing online interactive computer games can be an activity that provides gamers with excitement, mental stimulation, entertainment, and can also lead to social interaction between and among gamers and their friends through the interaction of multiple gamers' avatars in the virtual environment of the online computer game.

Subscriptions involving real world financial consideration being paid on a monthly or other periodic basis by a gamer for the ability to access and play online computer games, as well as initial purchase fees or sporadic one-time payments paid in exchange for a gamer's avatar acquiring and using in-game items in the virtual world of the computer game, all provide well-deserved compensation to the developers or purveyors of computer games (sometimes referred to herein as "software companies") whose software engineers, artists, and business people have spent many long hours creating rather amazing and fantastic computer games for the use and enjoyment of players throughout the world. However, one of the unfortunate aspects of the payments of periodic subscriptions, initial purchase fees, and sporadic one-time payments for in-game items, is that none of these payments of real-world funds by gamers has any direct, lasting financial benefit for the gamers. While such subscription payments, initial purchase fees, and purchases of in-game items do provide an indirect benefit to players in the sense that such payments of real world funds do provide the incentive for software companies to continue to develop newer and better online computer games that gamers enjoy playing, the current direct benefits to players are limited to those that are listed above; and such current direct benefits, while important, are somewhat temporary and ephemeral in nature.

It is desirable to couple online game play by gamers with more lasting and permanent benefits to the gamers themselves. This will make online game play more desirable and will be mutually beneficial to the gamers and the software companies. It is in this context that the embodiments discussed herein arise.

SUMMARY OF THE INVENTION

The invention is directed to computer game systems and methods that facilitate and encourage financial investment by gamers as a secondary benefit of online game play, or in some instances, the secondary benefit will inure to charitable organizations that are selected or designated by gamers or by the software companies that create, produce or sell the online computer games.

The invention and its embodiments are best practiced using a game system on which an online computer game is played comprising: at least one client system that provides for an audiovisual display and is also capable of receiving physical, verbal, or visual inputs from one or more players using the client system to interact with and play the online computer game, wherein the client system may be a T.V. or monitor connected to a game console, a desktop computer with a monitor or screen, a laptop computer, a tablet computer, a PDA, a cell phone, or similar device, and which client systems may also include one or more client input devices such as a game controller, joystick, gamepad, computer mouse, keyboard, touchscreen, track pad, pointing stick, microphone, digital camera, or a client input/output device such as a virtual reality head mounted display unit accepting ocular movement or direction as input, eye gaze tracker, holographic goggles, or other similar client input/ output devices; at least one game server that serves as a host for the online computer game and is the authoritative source of events and data for the online computer game and maintains digital data regarding the game state of the online computer game; a connection between the at least one client system and the at least one game server, wherein the connection may be a direct connection between the client system and the game server or may be comprised of a portion of the Internet, a wide area network (WAN), a local area network (LAN), a wireless LAN (WLAN), a metropolitan area network (MAN), a campus area network (CAN), a virtual private network (VPN), a cellular telephone network, a portion of the Public Switched Telephone Network (PSTN), an ad hoc network, an intranet, an extranet, another type of network, or a combination of two or more such networks; wherein the game state is comprised of all game play data and information; wherein the online computer game is experienced by one or more players as a virtual world that is displayed in an audiovisual manner to the player through the client system; and wherein each player playing the game is able to make inputs using the client system in order to control and manipulate one or more avatars that exist within the virtual world of the online computer game and are displayed to the player by the client system as existing and having their being within the virtual world of the online computer game. Game play involves a player making inputs through the client system that are processed by the software located on the client system, the game server, or both, resulting in movement or other action of the player's one or more avatars within the virtual world of the online computer game. The software of the game system and the game logic, whether located on the client system, the game server, or both, determines the outcome of the player's input and such outcome is displayed in the context of the virtual world displayed to the player by the client system. Some online computer games may be played by only one player, but more frequently such online computer games may be played by multiple players with each player controlling one or more avatars that exist and have their being within the virtual world of the online computer game, in which case the avatars controlled by multiple players can interact with each other in the virtual world of the online computer game, and game play typically, though not universally, consists of the avatars being presented with in-game activities that may be accomplished or in-game challenges, quests, or adventures in which the avatars may engage in the virtual world of the game.

The invention and its embodiments may be practiced in connection with online computer games having, or working in conjunction with, computer software, hardware, or a combination of both, that require the initial creation of a game play account and the payment of some amount of real world financial consideration in connection with that game play account in order for a prospective player to be able to access and play the online computer game. In this model, the game play account must be set up with at least some identifying information which identifies the game play account in some manner. The person that sets up the game play account is typically the prospective gamer that is going to play the online computer game, though the game play account could also be created based on input of identifying information by a parent in situations where the prospective player is a minor. In some online computer games, the game play account used by a gamer to obtain access to the online computer game may be a social media account that is created by the gamer or that was previously created by the gamer for use in connection with a social media website. Nevertheless, in this model, regardless of which person creates the game play account and regardless of whether or not the game play account is also a social media account or a free-standing game play account created purely for access to the online computer game, someone must initially create the game play account in order for a gamer to obtain access to, and to play, the online computer game using the game play account. As discussed, in this type of model the game play account is set-up or created using at least some type of information or data identifying the game play account, such as, for example, one or more of the following: a user name, a pass code, an e-mail address, personal questions that must be answered, an image, a credit card number, a physical address, a telephone or cell phone number, or other similar identifying information provided at the time the game play account is created. In the model discussed in this paragraph, the invention and its embodiments may be practiced when a payment of some amount of real-world financial consideration (also sometimes referred to as "real world funds" or "real-world currency") is made in exchange for a player's ability to access and play the online computer game using the game play account. Such payment of real world funds that is required in exchange for a player's ability to access and play the online computer game using the game play account may be in the form of a purchase payment, a one-time initial payment, a series of subscription payments, a pay as you go model, or some combination of two or more of these payment models.

In accordance with one embodiment of the invention, there is provided a method comprising: requiring a payment of real-world funds in exchange for the ability of a gamer to access and play an online computer game using a game play account; offering the gamer the opportunity to make an additional, optional investment payment in an amount selected by the gamer; electronically transferring the optional investment payment to a linked online investment account by means of the game system or related computer software or hardware, where the linked online investment account is owned by, or held for the benefit of, the gamer, a charitable institution, or another account holder of the linked investment account; using the amount transferred into the linked investment account to purchase financial securities that may increase in value and are to be held in the linked online investment account for the benefit of the gamer, a charitable institution, or other designated account holder; providing the gamer with certain real-world rewards related to the online computer game and/or providing certain in-game benefits to be acquired and used by the gamer's avatar in the virtual world of the online computer game, with the value and desirability of the real-world rewards and/or in-game benefits being proportionally related to the amount of the optional investment payment that is made. As set forth above, the account holder of the game play account is often the gamer, and the account holder of the linked investment account will also often be the gamer. However, it is possible that the account holder for the game play account is separate from the owner or beneficial owner of the linked investment account, such as when a parent owns the game play account and is the player of the game, but the linked investment account is set-up for the benefit of the parent's minor child, as might occur when the linked investment account is a college savings plan for the minor child. The financial securities that are purchased and held in the linked online investment account may be any desirable type of financial securities, including shares of equities (stock), shares of stock funds, bonds, shares of bond funds, mutual funds, exchange traded funds, index funds, certificates of deposit (CDs), savings bonds, treasuries, or any other similar financial security or financial product that may be held in the linked online investment account and may accrue in value over time. The linked online investment account may be in the form of a traditional brokerage account, an individual retirement account (IRA), a retirement account such as a 401K, a trust account, a college savings plan such as a 529 plan or UGMA account, or any other such investment account that is capable of receiving online transfers of real-world currency from a game system or a game play account for the purpose of purchasing financial securities to be held in the linked investment account. In some instances, an optional investment payment that is transferred into the linked online investment account will be allowed to accumulate over time with later optional investment amounts that are subsequently made such that the accumulation of real-world funds will continue until the amount of real-world currency accumulated is of a sufficient amount to pay the purchase price required for the purchase of a chosen financial security that is to be purchased and held in the linked online investment account, at which time the accumulated amount will be transferred to the linked online investment account and used to purchase the chosen financial security, or if accumulation of the optional payment amounts occurs in the linked online investment account itself, will simply be used to purchase the desired financial security. In this embodiment, the amount of the optional investment payment that is paid will determine a level of real-world rewards the account holder of the game play account or the gamer will receive and/or the level of special in-game items to which the gamer's avatar will obtain access in the online game as a result of the optional investment payment. In other words, the real-world rewards and/or in-game benefits that the player or the player's player character will receive will be tiered such that the rewards or benefits obtained as a result of making the optional investment payment will depend upon the amount of the optional investment payment that is paid. Greater amounts of real-world currency paid as the optional investment amount and transferred into the linked investment account will result in greater or more real-world rewards and/or in-game benefits. The tiers of real-world rewards and/or in-game benefits will be defined by the amount of the optional investment payment that is paid. For example only, a first tier of rewards or benefits could be based on the payment of at least $25 but less than $50 in real world funds to be deposited into the linked investment account, which would result in a first level of rewards and/or benefits being received by the account holder of the game play account or the gamer or gamer's avatar. In this example, access to a second tier of rewards and benefits would be based upon a payment of at least $50 but less than $75, where the real-world rewards and in-game benefits for the second tier would be better in quality and/or quantity than the first tier rewards and benefits. To continue with this example, a third tier of even more desirable rewards and benefits could be accessed with an optional investment payment of $75 or greater. Thus, the account holder or the game play account and/or gamer is incentivized to make a larger optional investment payment in order to obtain better real-world rewards or in-game benefits. Such real-world rewards could be, for example, tickets to concerts, tickets to attend online gaming conventions, tickets to other public events or conventions, or hardware or software items for use in connection with the game system itself. Such in-game benefits to be acquired or used by a gamer's avatar in the virtual world of the online computer game could be, for example, special powers, abilities, attributes, characteristics, weapons, shields, skins, spells, strength, lives, life force, magic potions, mounts, coins, currency, gems, treasure, food, seeds, animals, houses, building materials, machines, or articles of clothing.

In accordance with a slightly different embodiment of the invention, there is provided a method comprising: requiring a payment of real-world financial consideration in exchange for the ability of one or more gamers to access and play an online computer game; diverting all or a chosen percentage of the payment of real-world financial consideration by use of a game system or related computer software, hardware, or a combination thereof working in conjunction with the game system, such that the amount of real-world financial consideration that is diverted from the payment of real-world financial consideration is transferred electronically into a linked online investment account that is owned by, or held for the benefit of, the person that is the account holder of the game account; and using the amount transferred into the linked online investment account to purchase financial securities that may increase in value and are to be held in the linked online investment account for the benefit of the account holder of the game account or another party designated by the account holder. As set forth above, the account holder of the game account is often the gamer, and therefore the linked investment account will often be owned by, or will exist for the benefit of, the gamer himself or herself, but it is possible that the account holder for the game account is separate from the owner or the beneficial owner of the linked investment account, such as when a parent owns the game account and is the player of the game, but the linked investment account is set-up for the benefit of the parent's minor child as might occur when the linked investment account is a college savings plan for the child. The financial securities that are purchased and held in the linked online investment account may be any desirable type of financial securities, including shares of equities (stock), shares of stock funds, bonds, shares of bond funds, mutual funds, exchange traded funds, index funds, certificates of deposit (CDs), savings bonds, treasuries, or any other similar financial security or financial product that may be held in the linked online investment account and may accrue in value over time. The linked online investment account may be in the form of a traditional brokerage account, an individual retirement account (IRA), a retirement account such as a 401K, a trust account, a college savings plan such as a 529 plan or UGMA account, or any other such investment account that is capable of receiving online transfers of real-world currency from a game system or a game account for the purpose of purchasing financial securities to be held in the linked investment account. In some instances, the real-world currency transferred into the linked online investment account, or to be transferred into the linked online investment account, will be allowed to accumulate with later real-world currency that is diverted from later payments that are subsequently made for the one or more players'continued access and play of the online computer game. Such accumulation of diverted real-world currency may occur in a database, the player's game account, or another related database or holding account that is related to, or controlled by, the game system, such that the accumulation will continue until the amount of real-world currency accumulated is of a sufficient amount to pay the purchase price required for the purchase of a chosen financial security that is to be purchased and held in the linked online investment account, at which the accumulated amount will be transferred to the linked online investment account and used to purchase the chosen financial security, or if accumulation occurs in the linked online investment account, will simply be used to purchase the desired financial security.

In accordance with another embodiment of the invention that may be accomplished as a variation on either of the embodiments discussed above in the two foregoing paragraphs, there is provided a method comprising: payment of real-world financial consideration by an account holder of the game play account, either in the form of an optional investment payment as discussed above, or in the form of a required payment made for the ability to access and play the online computer game as discussed above; allocating all or a chosen portion of said payment of real-world financial consideration as a function of the game system's software or game logic among one or more in-game items or in-game value items such that said in-game items or in-game value items will appear in the virtual world of the computer game and will be linked by means of the game system software or game logic to the amount of real-world financial consideration that has been allocated to those in-game items or in-game value items; allowing the gamer's avatar to take action in the virtual world of the online computer game whereby the avatar may acquire or collect the said in-game items or in-game value items within the virtual world of the online computer game during game play; for each of the said in-game items or in-game value items that are acquired or collected by the gamer's avatar in the virtual world of the computer game, transferring the allocated, linked amount of real-world financial consideration that was linked to the in-game item or in-game value item into a linked online investment account that is owned by or held for the benefit of the gamer or another; using the amount of real-world financial consideration transferred into the linked online investment account to purchase real-world financial securities that may increase in value over time that will be held in the linked online investment account for the benefit of the gamer or other person.

Alternatively, certain embodiments of the invention are best practiced in connection with online computer game systems in which a player must pay real-world currency to the software company for purchase of one or more in-game items that exist within the virtual world of the online computer game, such that in exchange for the payment of real-world currency to the software company, the player's avatar acquires and can use the one or more in-game items during game play within the virtual world of the online computer game. In other words, in this model, a player must pay real-world funds in exchange for the player's avatar obtaining access to, and use of, an in-game item in the virtual world of the online game. Often such payments of real-world currency for the purchase of in-game items are accomplished as charges to an account holder's or player's credit card, debit card, Pay Pal Account, or similar payment account that allows for the more or less contemporaneous payment of real-world financial consideration in exchange for the player's avatar acquiring the in-game item in the virtual world of the computer game. The types of in-game items that may be purchased and used in the virtual world of the game may be, for example, special powers, abilities, attributes, characteristics, weapons, shields, skins, spells, magic potions, mounts, coins, currency, gems, treasure, food, seeds, animals, houses, building materials, machines, or articles of clothing.

In accordance with an embodiment of the invention that may be practiced in connection with the model discussed immediately above, there is provided a method comprising: requiring gamers to expend real-world currency for the purchase of in-game items that exist in the virtual world of an online computer game and may be acquired and used by the gamer's avatar in the virtual world of the computer game; transferring all or a selected portion of the real-world currency expended by the gamer for purchase of the in-game item to a linked investment account for the purchase of financial securities to be held in the linked investment account, where the purchase of financial securities may occur more or less contemporaneously with the transfer of the amount of real-world currency being transferred into the linked investment account, or may occur subsequently after additional purchases of in-game items have occurred resulting in accumulation with additional amounts of real-world currency for transfer into the linked investment account and use in purchasing financial securities.

In yet another embodiment of the invention, there is provided a method comprising: requiring a gamer or a holder of a game account to expend real-world currency for the ability of a gamer to access and play an interactive online computer game or allowing the gamer or account holder to pay real-world currency as an optional investment amount; linking all or a portion of said real-world currency that is paid to the potential successful completion of one or more in-game challenges or in-game quests by the gamer's avatar within the virtual world of the online computer game by means of the game system software or game logic; transferring the amount of the real-world currency linked to the potential successful completion of an in-game challenge or quest to a linked investment account upon the successful completion of the in-game challenge or in-game quest by the gamer's avatar.

BRIEF DESCRIPTION OF THE DRAWINGS

The following description is to be read in conjunction with the identified drawing figures that are included as a part of this patent application.

DETAILED DESCRIPTION OF THE DRAWINGS

The following detailed description is to be read in conjunction with the identified drawing figures that are included as a part of this patent application.

Figure 1:
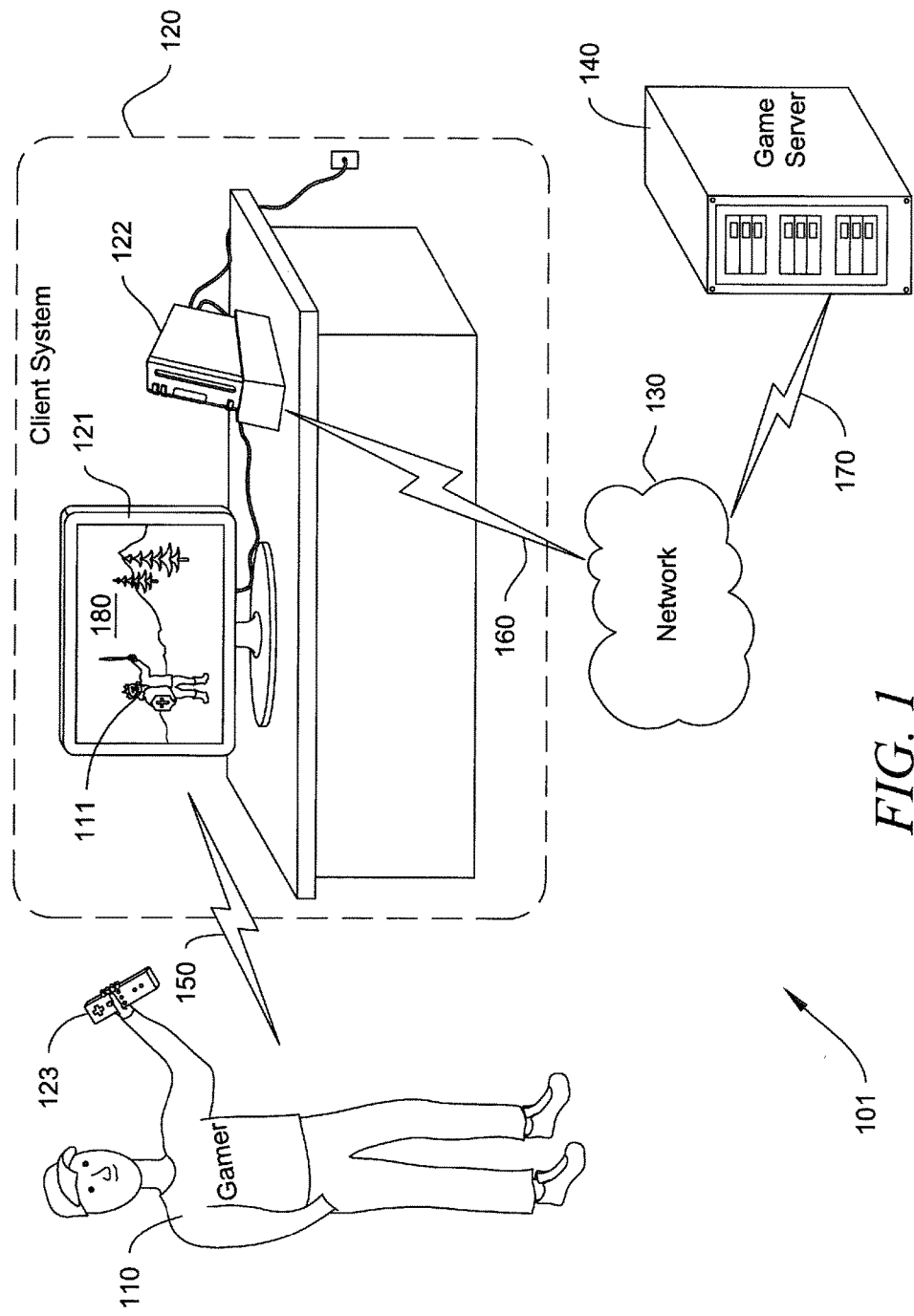
FIG. 1 illustrates an example of a computer game system for implementing online computer game embodiments.

FIG. 1 is an illustration of a computer game system 101 that may be used to implement embodiments disclosed hereby. A computer game system 101 may be played by a gamer 110 and the computer game system 101 comprises a client system 120 that features an audiovisual display 121 connected to a client system processor 122 that is capable of receiving gamer input 150 and providing gamer output 150 to the gamer 110 and is capable of transmitting to a game server 140 game play input 160 and receiving from the game server 140 game play output 170, wherein the game play input 160 and game play output 170 may be transmitted over a network 130 connecting the client system 120 and the game server 140. The client system will also include a client input device 123 that facilitates gamer input 150 into the client system. The client system will include an audiovisual display 121 that displays a graphical user interface 180 generated by the computer game system 101 that is experienced by the gamer 110 as a virtual world in which the garner controls an avatar 111 that exists and may move and take action within the virtual world of the online computer game and is visualized in the graphical user interface 180 displayed by the audiovisual display 121 in that gamer input 150 is received and processed by the client system processor 122 and/or the game server 140 and such processing by the client system processor 122, the game server 140, or both, results in movement or other action of the avatar 111 within the virtual world displayed in the graphical user interface 180.

Figure 2:
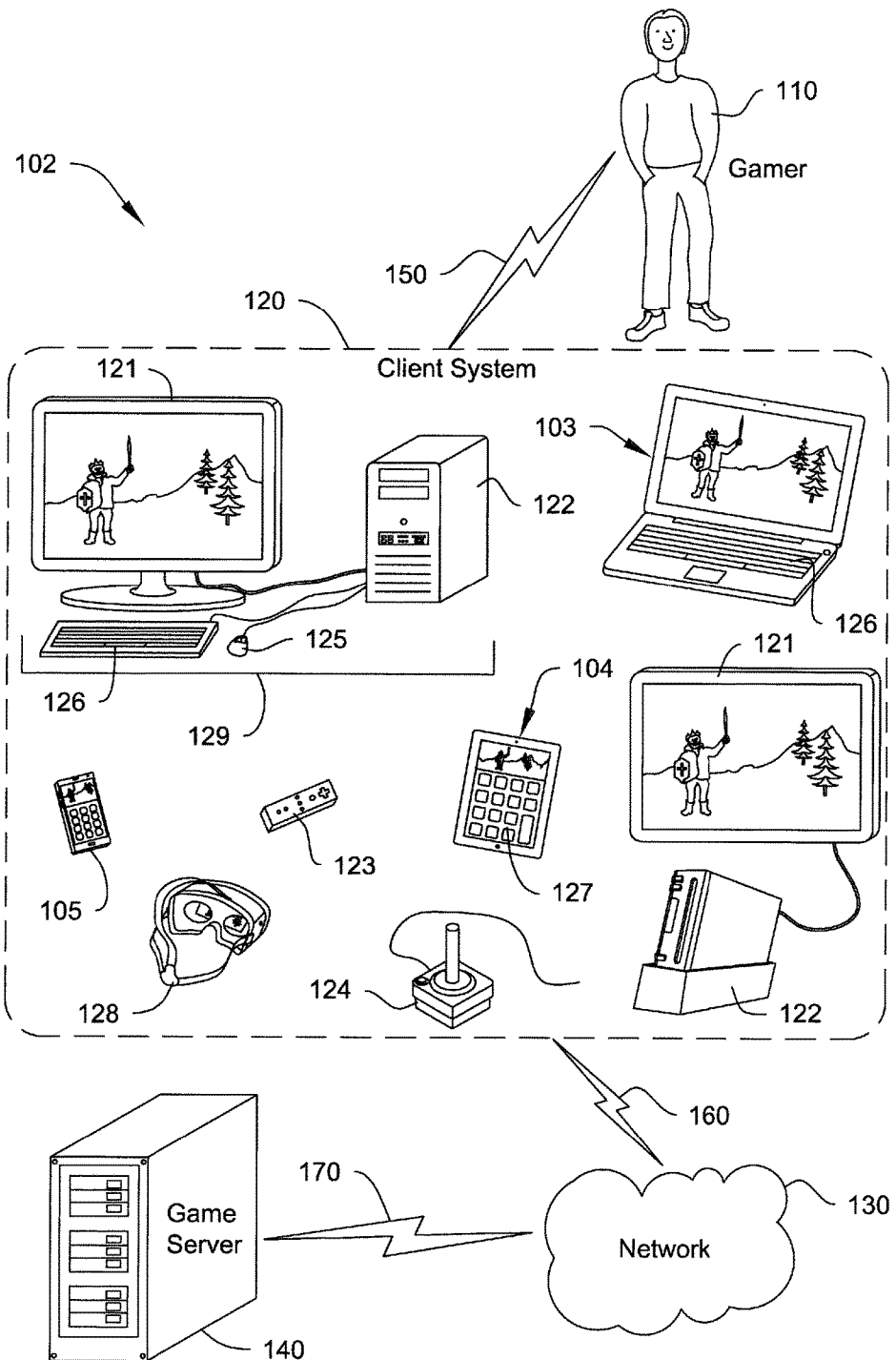
FIG. 2 illustrates an additional example of a computer game system for implementing online computer game embodiments.

FIG. 2 illustrates an additional example of a computer game system 102 that may be used to implement embodiments disclosed hereby. The computer game system 102 may be played by a gamer 110 using a client system 120, wherein the client system 120 is part of the game system 102, and the client system 120 is comprised of one or more devices such as a smart phone 105, a desktop computer 129, a tablet computer 104, a laptop computer 103, a virtual reality head mounted display unit 128, a game console 122 attached to a T.V. or monitor that serves as a display 121 or other suitable client system with equivalent functions. The client system 120 may also comprise one or more client input devices, such as a game controller 123, a joystick 124, a computer mouse 125, a keyboard 126, a touch screen 127, or similar client input device. The client system 120 may be directly connected to a game server 140 or may even be located on the same device in certain instances, but is more typically connected to the game server 140 via a computer network 130 such as a portion of the Internet, a wide area network (WAN), a local area network (LAN), a wireless LAN (WLAN), a metropolitan area network (MAN), a campus area network (CAN), a virtual private network (VPN), a cellular telephone network, a portion of the Public Switched Telephone Network (PSTN), an ad hoc network, an intranet, an extranet, another type of network, or a combination of two or more such networks. During normal game play using the computer game system 102, a gamer 110 may interact with the computer game through input/output 150 to/from the client system 120. Some processing of the input 150 received from the gamer 110 by the client system 120 may be processed by software and/or hardware located in the client system 120. The client system 120 is capable of its own input/output 160 to/from the computer network 130. In turn, the game server 140 is capable of input/output 170 to/from the computer network 130. The game server 140 is composed of hardware and software that processes input 170 received from the computer network 130 and producing output 170 to the computer network 130 following processing within the game server 140. The output 170 from the game server 140 to the computer network 130 is then transmitted as output 160 back to the client system 120 where it is either immediately rendered as output 150 to the gamer 110, or more commonly is processed to some degree by software or hardware located on the client system 120 with resulting output 150 to the gamer 110.

Figure 3A:
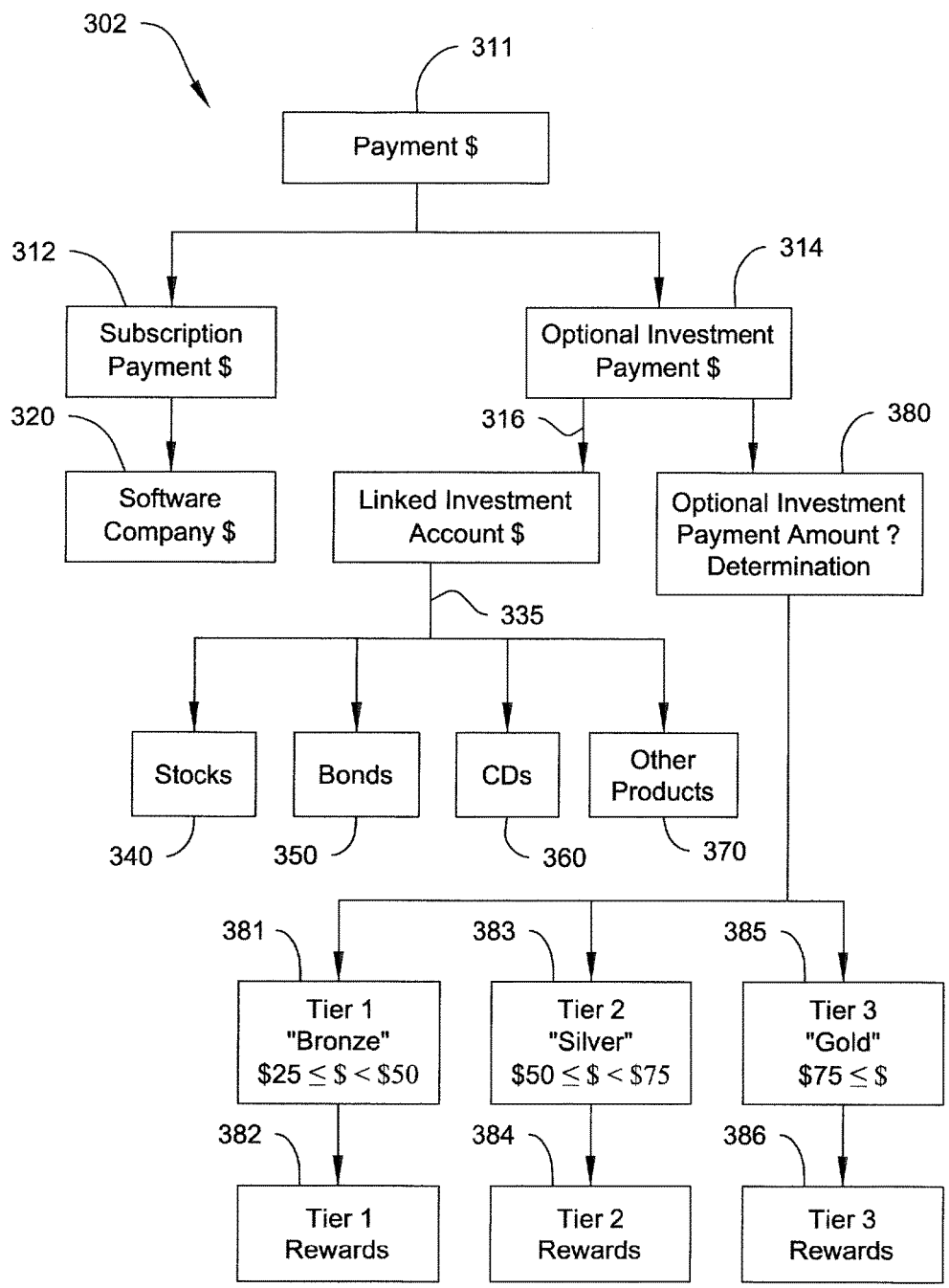
FIG. 3A is a flow diagram that illustrates a method of facilitating financial investment by allowing a game account holder or player to make an optional investment payment into a linked investment account with the amount of the optional investment amount paid linked to varying tiers of real-world rewards and/or in-game benefits.

FIG. 3A is a flow diagram that illustrates an embodiment 302 in which a payment of real-world funds is made 311, part of which payment of real-world funds 311 is a subscription payment 312 that is transferred to a software company 320, and part of which is an optional investment payment 314 that is transferred into a linked investment account 330 and is subsequently used by computer software and/or hardware 335 to purchase financial securities such as stocks 340, bonds 350, CDs 360, or other similar financial products 370 such as stock funds, bond funds, index funds, savings bonds, etc. to be held in the linked investment account 330. A determination function of the game system software or game logic 380 is told what amount of the real-world funds payment 311 was paid as optional investment payment 314 and processes this data to determine the tier applicable to such amount of optional investment payment 314 such that a first amount of optional investment payment 314 will result in a first tier status 381 entitling the game account holder or gamer to first tier rewards 382, a second amount of optional investment payment 314 will result in second tier status 383 entitling the game account holder or gamer to second tier rewards 384, and a third amount of optional investment payment 314 will result in third tier status 385 entitling the game account holder or gamer to third tier rewards 386.

Figure 3B:
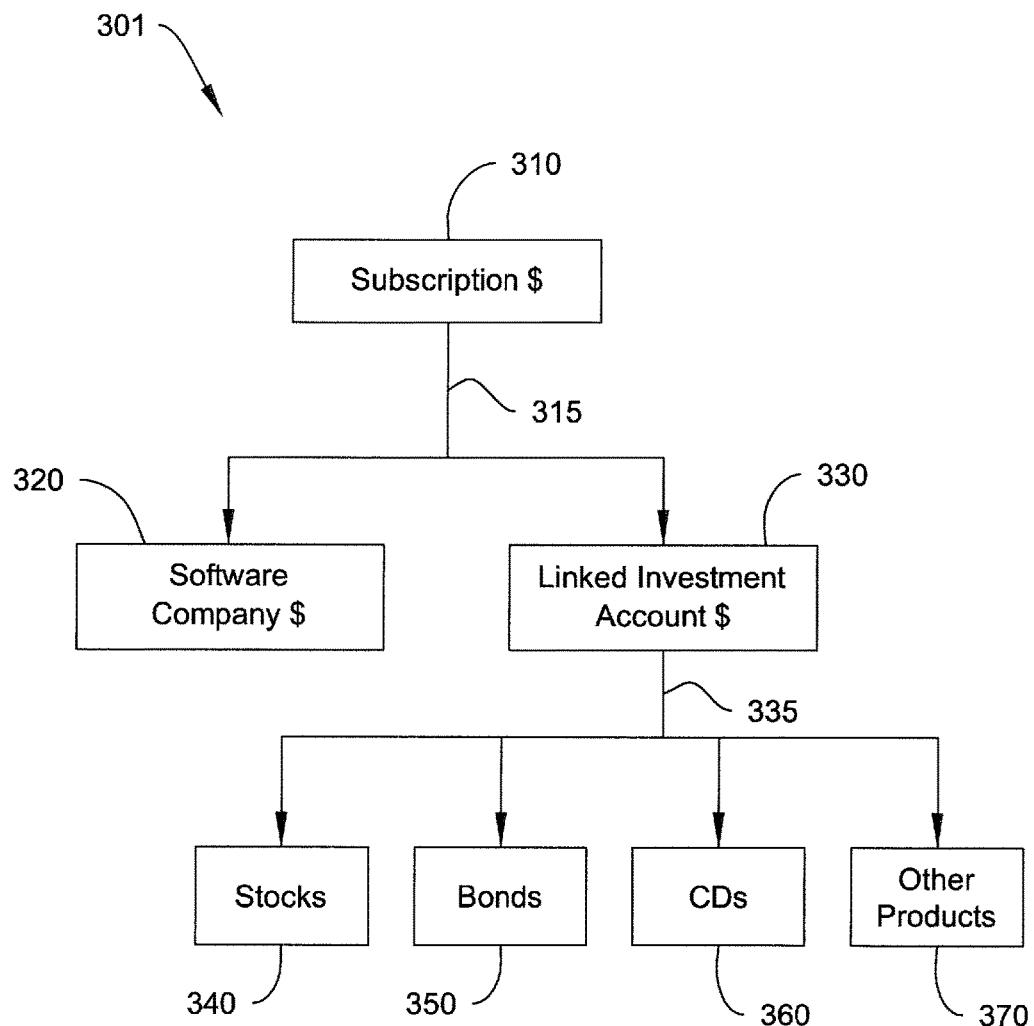
FIG. 3B is a flow diagram that illustrates a method of facilitating financial investment through partial diversion of a subscription payment to a linked investment account.

FIG. 3B is a flow diagram that illustrates an embodiment 301 in which a subscription payment 310 is required for game play and the subscription payment 310 is divided as a function of computer software and/or hardware 315, into an amount of financial consideration that is received by the software company 320 and an amount of financial consideration that is transferred into a linked investment account 330. The amount of financial consideration that is transferred into the linked investment account 330 is subsequently used by computer software and/or hardware 335 to purchase financial securities such as stocks 340, bonds 350, CDs 360, or other similar products 370 such as stock funds, bond funds, index funds, savings bonds, etc. It should be appreciated that the required subscription payment 310 is comprised of whatever amount of payment is required by the software company for game play 320 and an additional amount of real-world funds to be paid into the linked investment account 330, such that the software company is not disadvantaged. In other words, the amount that the software company would normally charge for basic access to, and play of, the online computer game 320 is not diminished by virtue of the fact that the payment by the account holder or gamer 310 may be called a "subscription payment" since the portion of that payment 310 to be received by the software company 320 is wholly within the control of the software company and is a function of market factors and business decisions.

Figure 4:
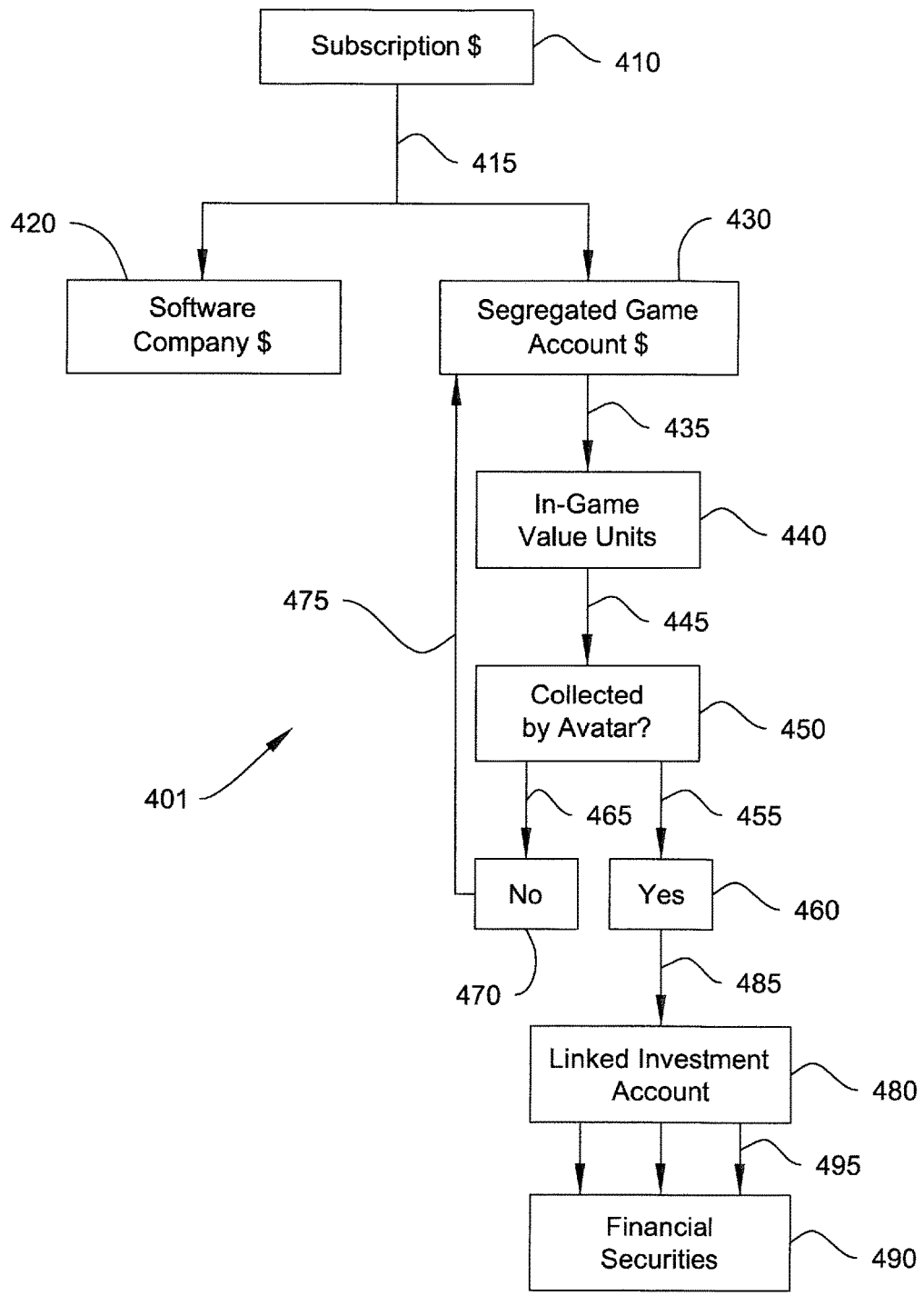
FIG. 4 is a flow diagram that illustrates a method of facilitating financial investment through use of in-game value units.

FIG. 4 is a flow diagram that illustrates an embodiment 401 in which a subscription payment 410 is required for game play and the subscription payment 410 is divided as a first function of game system software 415 into an amount of financial consideration that is received by the software company 420 and an amount of real-world funds that are temporarily held in a segregated game account 430. The segregated game account 430 may be a computerized database, electronic account, or module of the game software that temporarily holds the amount of real-world funds that have been transferred into the segregated game account 430. The amount of real-world funds held within the segregated game account 430 is then allocated by a second function of the game system software 435 among multiple in-game value units 440 which are virtual objects that are created by the game software or game logic and exist within the virtual world of the computer game and may be displayed to the gamer (not pictured) in the graphical user interface (also not pictured). The allocation accomplished by said second function of the game system software 435 causes the allocated portions of the real-world funds held in the segregated game account 430 to be linked to in-game value units 440. These in-game value units 440 may appear in the graphical user interface of the computer game that is displayed to the gamer by a client system in the form of virtual objects that are available for collection or acquisition by the avatar, such as, for example, virtual gold coins, silver coins, gold treasures, treasure boxes, gemstones, diamonds, rubies, emeralds, and other such precious stones, amulets, flowers, items of food or drink, dollar bills, other types of currency, or other similar virtual objects that are displayed to a gamer by a client system as part of game play and that signify in-game value that may be collected or acquired by the gamer's avatar while playing the online computer game. When the gamer's avatar has an encounter 445 with such an in-game value unit 440 within the virtual world of the computer game, there is an opportunity for the avatar to collect or acquire the in-game value unit 440. A third function of the game software or game logic 450 determines if the avatar successfully collects or acquires the in-game value unit 440 in the virtual world of the computer game. If the gamer's avatar does not collect or acquire 465 the in-game value unit 440 within the virtual world of the computer game, the said third function 450 determines that no collection has occurred 470 and the portion of the real-world funds that had been allocated and linked to the now uncollected in-game value unit 440 are returned 475 to the segregated game account 430 and become available to be reallocated and linked to other in-game value units 440 by virtue of the said second function 435 of the game software such that the other in-game value units 440 may subsequently be encountered 445 by the gamer's avatar within the virtual world of the game. If, on the other hand, the in-game value unit 440 is collected or acquired 455 by the gamer's avatar within the virtual world of the computer game, then the said third function 450 determines that the collection of the in-game value unit by the avatar has occurred 460 and the portion of the total amount of real-world funds in the segregated account 430 that was previously allocated and linked to the now collected in-game value unit 440 is electronically transferred 485 into a linked investment account 480 where it is used to make purchases 495 of financial securities 490. As discussed concerning FIG. 3B above, although the initial payment shown in FIG. 4 is characterized as a "subscription payment" 410, it should be appreciated that the amount to be received by the software company as its real-world consideration 420 is determined by the software company. Moreover, as previously discussed with regard to FIG. 3A, it is possible to restructure this embodiment of the invention shown in FIG. 4 such that the total amount of real-world funds transferred into the segregated game account 430 is wholly optional such that it would be the decision of the game play account holder and/or the player how much, if any, real-world funds would be paid into the segregated game account 430 beyond the amount required to be paid to the software company as its real-world financial consideration 420.

Figure 5:
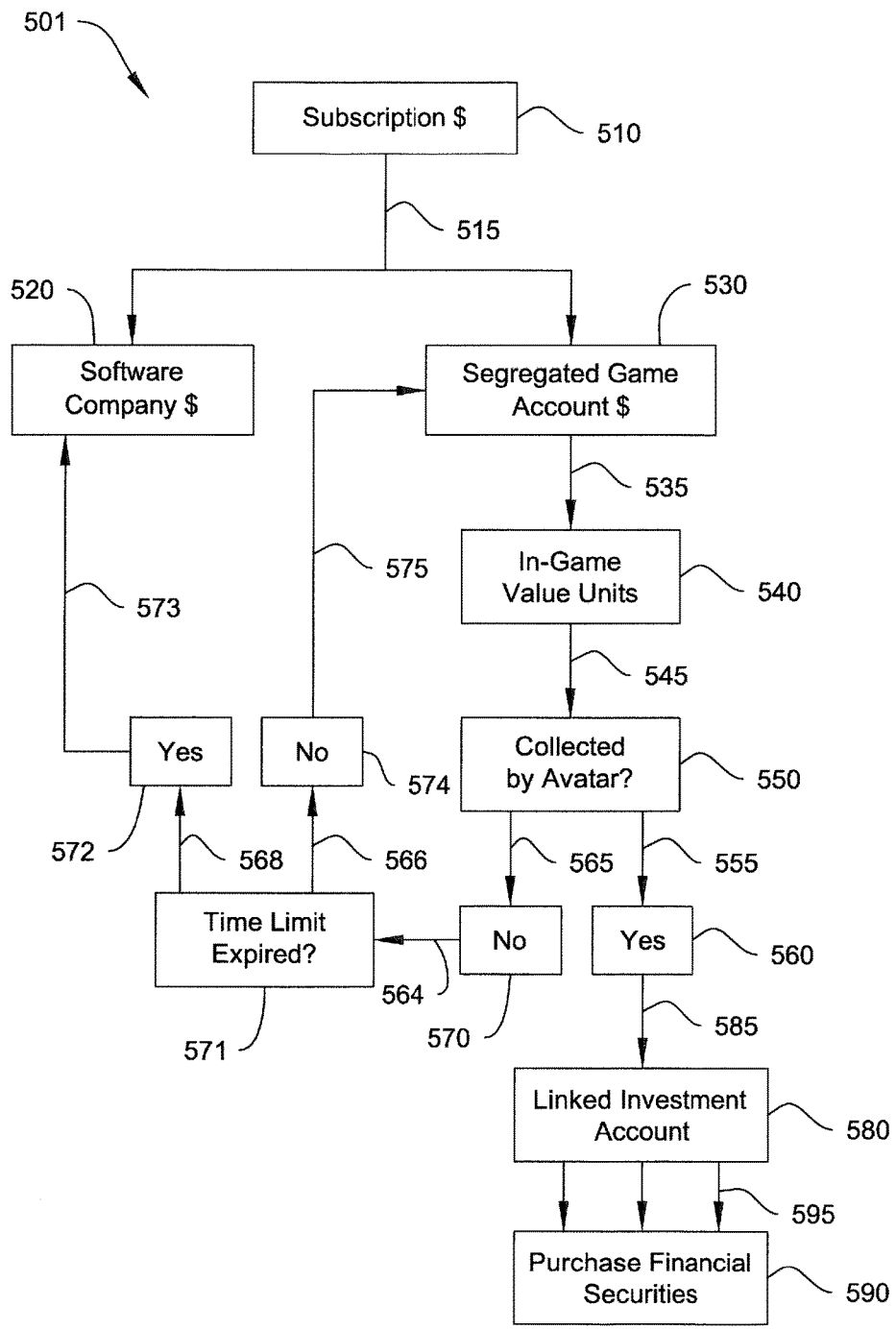
FIG. 5 is a flow diagram illustrating an alternative method of facilitating financial investment through use of in-game value units with a time limit limiting the time during which the in-game value units may be collected for transfer of real-world financial value to a linked investment account.

FIG. 5 is a flow diagram illustrating an embodiment in which a subscription payment 510 is required for game play and the subscription payment 510 is divided by a first function of game system software 515 into an amount of financial consideration that is transferred to the software company 520 and an amount of real-world funds that are transferred into a segregated game account 530. The segregated game account 530 may be a computerized database, electronic account, or other module in the game software that temporarily holds the amount of real-world funds that are transferred into the segregated game account 530. The amount of real-world funds held within the segregated game account 530 is then allocated and linked by means of a second function of the game system software 535 among multiple in-game value units 540 which are virtual objects that are created by the game software or game logic and exist within the virtual world of the computer game and may be displayed as part of the graphical user interface (not pictured) seen by the gamer (not pictured). In this manner, the said second function 535 apportions the real-world funds held in the segregated game account 530 among multiple in-game value units 540 and links each such portion of the real-world funds held in the segregated game account 530 to a discrete in-game value unit 540 that may later be collected or acquired by the gamer's avatar as game play progresses. The in-game value units 540 that are each linked to portions of the real-world funds held in the segregated game account 530 and which are subject to collection or acquisition by the gamer's avatar during game play will appear as virtual objects in the graphical user interface of the computer game that is displayed to the gamer by a client system, and such virtual objects may take various forms signifying value in the game, such as, for example, virtual gold coins, silver coins, gold treasures, treasure boxes, gemstones, diamonds, rubies, emeralds, and other such precious stones, amulets, flowers, items of food or drink, dollar bills, other types of currency, or other similar virtual objects that are displayed to a gamer by a client system as part of game play and signify in-game value that may be collected or acquired by a gamer's avatar while playing the computer game. When the gamer's avatar has an encounter 545 with such an in-game value unit 540 within the virtual world of the computer game, there is an opportunity for collection of the in-game value unit 540 by the gamer's avatar. A third function of the game software 550 determines whether or not during such encounter 545 the gamer's avatar has taken the appropriate action in the virtual world of the game to collect 555 the in-game value item 540 that has been encountered 545, and the determination that the avatar has taken action to collect 555 and has successfully collected 560 the in-game value item 540 causes the portion of real-world funds in the segregated game account 530 previously linked to the now collected in-game value unit 540 to be electronically transferred 585 into a linked investment account 580 where it will be used to purchase 595 financial securities 590. If, on the other hand, the gamer's avatar has an encounter 545 with an in-game value unit 540 that is linked to a portion of the real-world funds stored in the segregated game account 530 and fails to take the necessary steps to collect 565 and therefore does not collect 570 the in-game value unit 540, the said third function 550 determines that no collection has occurred 570 within the virtual world of the computer game. At this point, the portion of real-world funds in the segregated game account 530 previously linked to the now uncollected in-game value unit 540 may be again made available 575 within the segregated game account 530 to be reallocated and linked to other in-game value units 540 by virtue of said second function 535 of the game software, or the portion of the real-world funds held in the segregated game account 530 that was previously linked to the now uncollected in-game value unit 540 may be electronically transferred 573 to the software company 520. The determination on whether the portion of real-world funds held in the segregated game account 530 that was previously linked to the now uncollected in-game value unit 540 will be electronically transferred 573 to the software company 520 or reallocated and linked to other in-game value units 540 by the said second function 535 is made by a fourth function of the game software 571 that determines whether or not a predetermined amount of time, or "time limit," has expired after the most recent subscription payment 510 was made. If said fourth function 571 determines that the time limit has expired 572, then the amount of real-world funds in the segregated game account 530 that had been linked to the now uncollected in-game value unit 540 is electronically transferred 573 to the software company 520 as additional consideration, but if said fourth function 571 determines that such time limit has not expired 574, then the amount of real world funds held in the segregated game account 530 that had previously been linked to the now uncollected in-game value unit 540 is again made available 575 to be allocated and linked to one or more other in-game value units 540 that have not yet been encountered by the player's avatar in the virtual world of the game.

Figure 6:
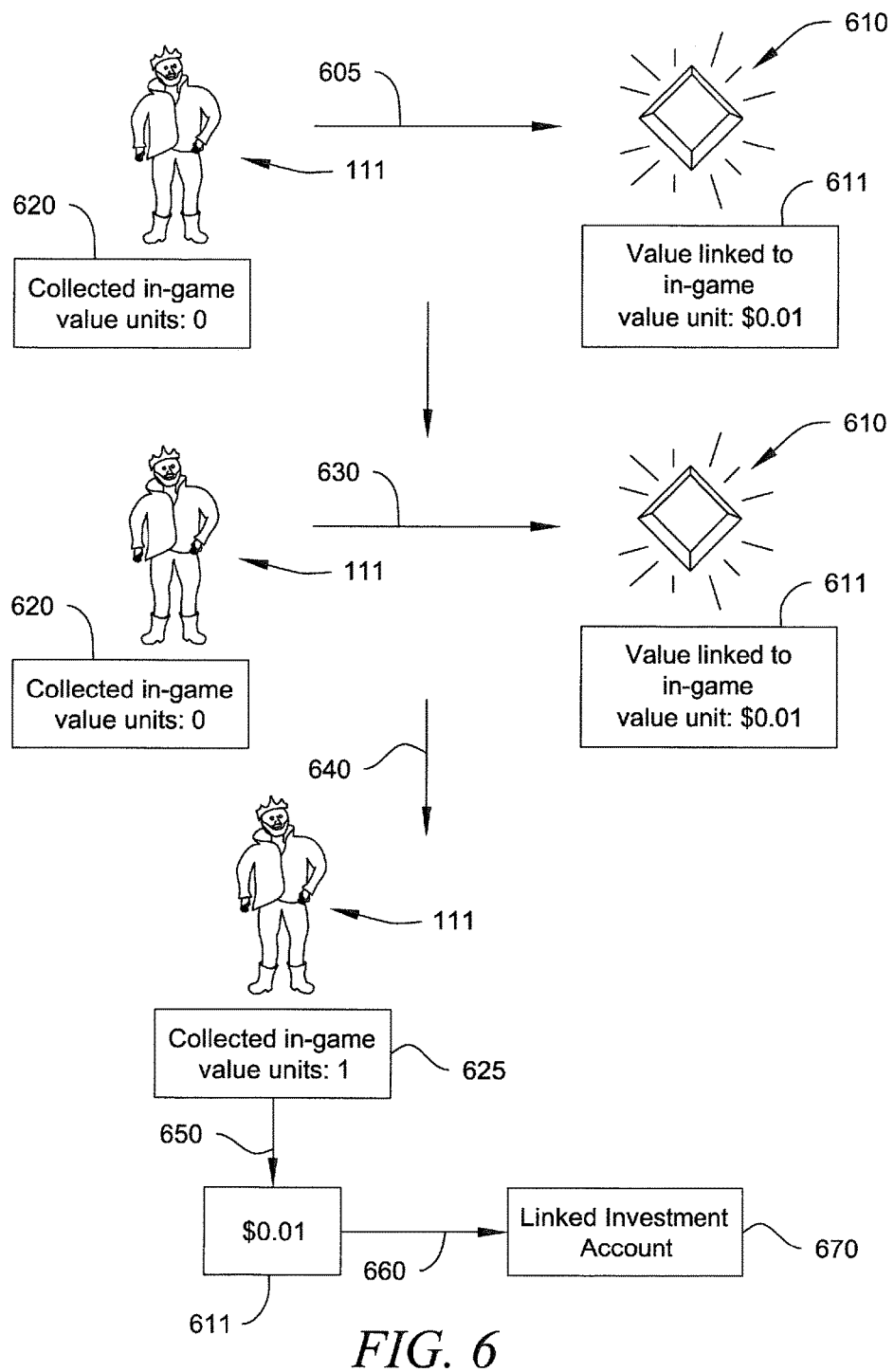
FIG. 6 is an illustration showing one scenario in which a gamer's avatar can collect an in-game value unit resulting in transfer of real-world financial value to a linked investment account.

FIG. 6 is an illustration of a potential scenario of an embodiment in which a player may use her in-game avatar 111 to collect an in-game value unit 610 that is linked to an amount of real-world funds having real-world value 611, where the avatar 111 is a virtual representation of the player in the virtual world of the online computer game, and the in-game value unit 610 is a virtual object that exists within the virtual world of the computer game. In this embodiment, the game system software keeps track of the real-world value 611 that is linked to the in-game value unit 610 such that a collection 640 of the in-game value unit 610 by the avatar 111 in the virtual world of the computer game results in the amount of real-world value 611 being electronically transferred 660 into a linked investment account 670. In this scenario, as the player's avatar 111 moves through the virtual world of the computer game, the player's avatar 111 has an encounter 605 with an in-game value unit 610 that is displayed by the game system as a virtual object within the virtual world of the computer game, and is linked as a function of the game software to an amount of real-world value 611. If the player's input to the game system causes the player's avatar 111 to take some action in the virtual world of the game with regard to collecting the in-game value unit 610, for example, by directionally moving its location 630 to the location of the in-game value unit 610 within the virtual world such that as a function of the game software the avatar 111 collects 640 the in-game value unit 610 and is credited with collection 625 of the in-game value unit 610 by the game software, then as a further function of the game software 650, the amount of real-world value 611 that was previously linked to the now collected in-game value unit 610 is electronically transferred 660 as a function of game software to the linked investment account 670. The essence of this embodiment is that a player can manipulate the avatar 111 through the player's input into the game system in order to collect the in-game value unit 610 triggering a transfer of an amount of real-world value 611 into a linked investment account 670, thereby incentivizing the player to continue playing the game and increasing investments in the linked investment account as a secondary benefit of game play.

Figure 7:
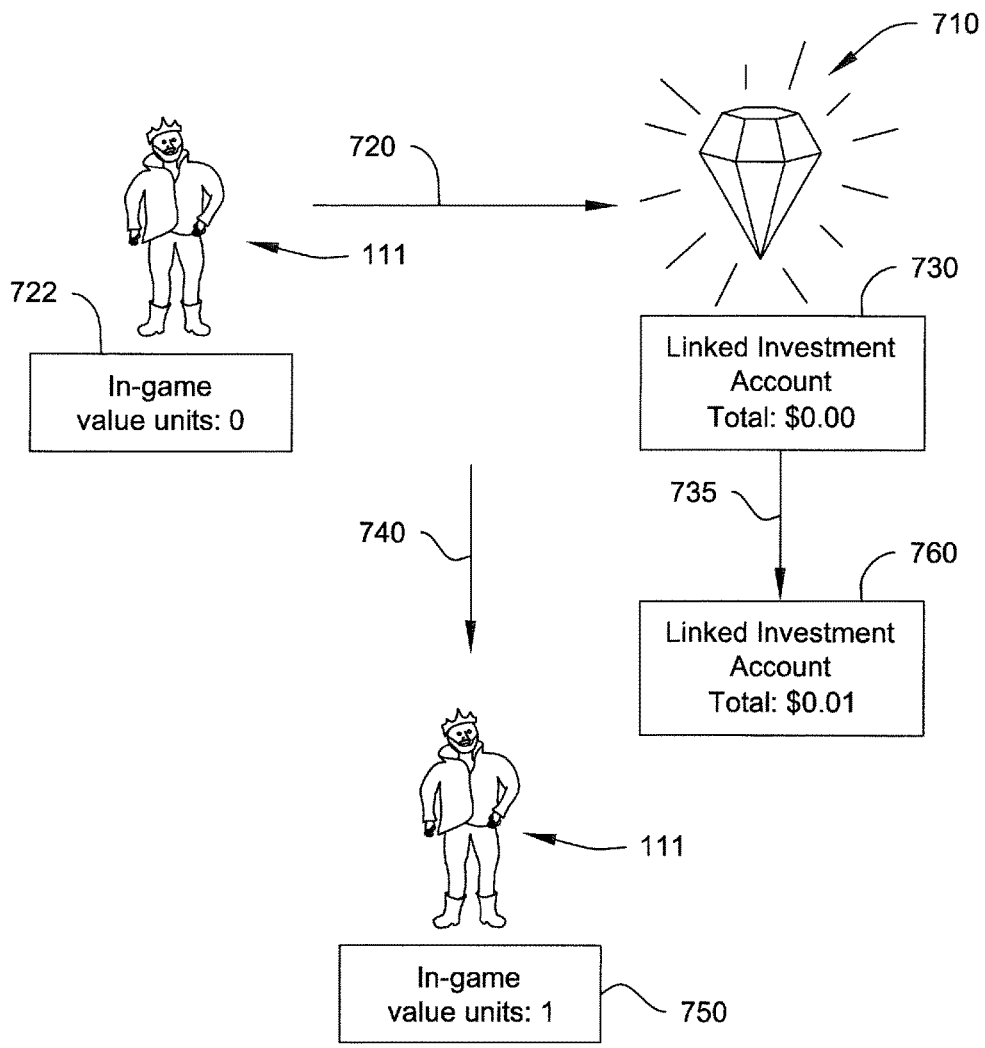
FIG. 7 is an illustration of an alternate scenario in which a gamer's avatar can collect an in-game value unit resulting in transfer of real-world financial value to a linked investment account.

FIG. 7 is an illustration of a scenario of one embodiment in which the player's avatar 111 that exists in the virtual world of the computer game takes action to collect 720 an in-game value unit 710 in the virtual world of the online computer game at a time when there is a first amount of real-world value in a linked investment account 730 such that when the in-game value unit 710 is actually collected 740, the player's avatar is credited with the collection 750 and an amount of real-world value is electronically deposited 735 as a function of the game logic or game software into the linked investment account such that the amount of real-world value held in the linked investment account is increased 760 and is greater than the first amount of real-world value in the linked investment account 730 that was present prior to collection 740 of the in-game value unit 710 by the avatar 111.

Figure 8A:
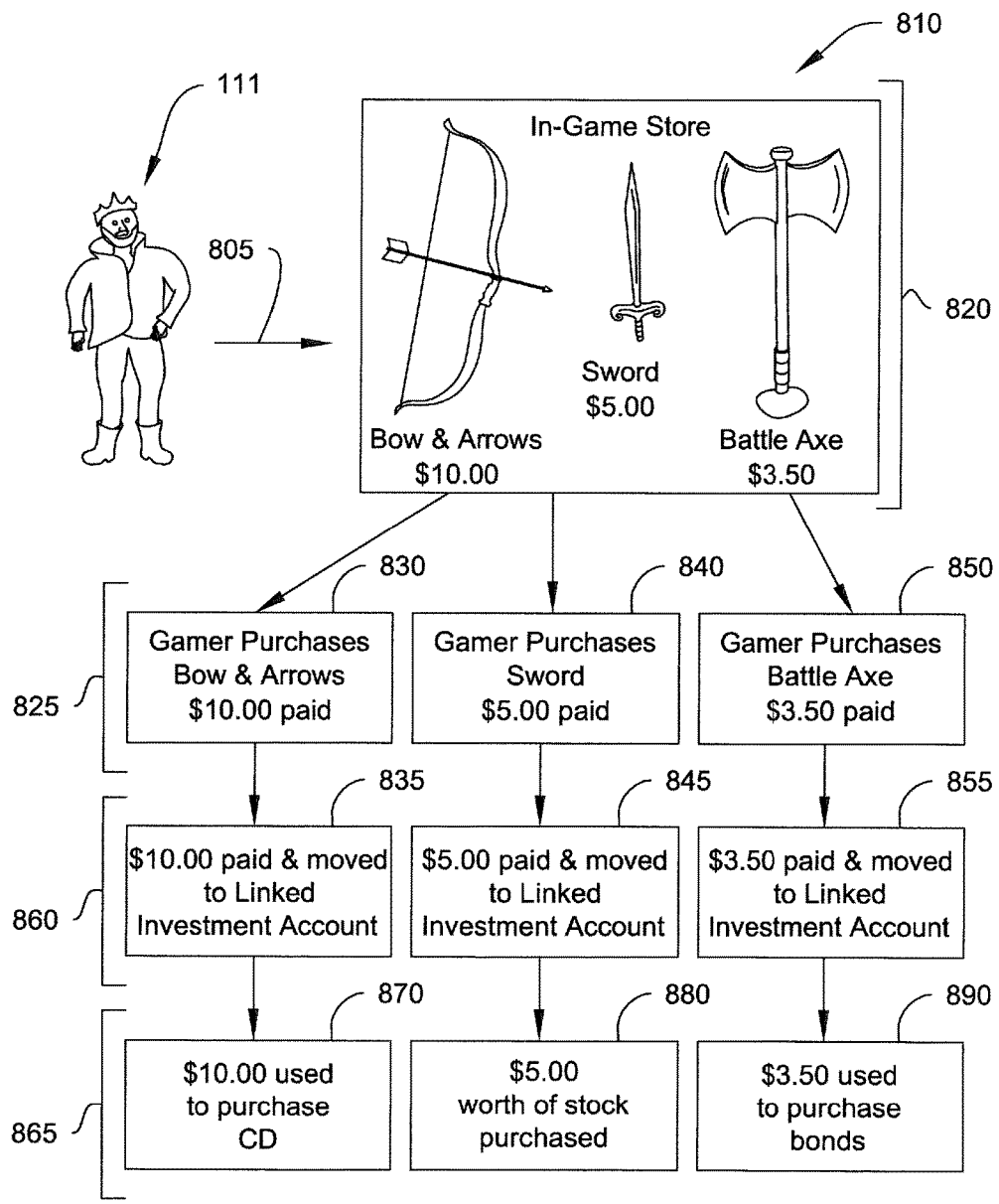
FIG. 8A is an illustration of another embodiment in which in-game items may be purchased by a gamer for use by the gamer's avatar by paying real-world currency with the result that real-world currency is transferred into a linked investment account where it is used to purchase real-world financial products such as shares of stock, bonds, or CDs.

FIG. 8A is an illustration of a scenario of an embodiment in which the gamer's avatar 111 has an encounter 805 with an in-game store 810 that is a virtual store or virtual market existing within the virtual world of the computer game such that the gamer is presented with the opportunity to purchase one or more in-game items 820 that are virtual objects offered for purchase by the gamer for use by the gamer's avatar 111 and which may be purchased from the in-game store 810. If the gamer makes a purchase 825 of one or more of the in-game items 820, such purchase 825 will require the gamer's payment of real-world financial consideration in exchange for the gamer's avatar 111 acquiring one or more of the in-game items 820 from the in-game store 810 for subsequent use by the avatar 111 in the virtual world of the computer game during game play. In this example, the in-game items 820 that are offered for purchase are shown as a virtual bow and arrows, virtual sword, and virtual battle axe, but these in-game items 820 that are virtual weapons are shown for illustrative purposes only since the in-game items 820 that are offered for purchase in the in-game store 810 may be any type or kind of virtual object for which the gamer would be required to pay real-world financial consideration in exchange for the gainer's avatar 111 acquiring and being able to use the one or more virtual objects within the virtual world of the computer game. In this example scenario, the gamer may take the step of purchasing 825 one or more of the in-game items 820 that are offered for purchase, for example, the garner may pay $10.00 of real-world financial consideration to purchase the virtual bow and arrows 830, the gamer may pay $5.00 of real-world financial consideration to purchase the virtual sword 840, or the gamer may pay $3.50 of real-world financial consideration to purchase the virtual battle axe 850. Once a purchase 825 has occurred involving the payment of real-world consideration by the gamer, all or a portion of the real-world consideration that has been paid by the gamer is electronically transferred into a linked investment account 860, such that, for example only, in the event of a purchase of the virtual bow and arrows in exchange for the gamer's payment of $10.00 in real-world financial consideration 830, the $10.00 that has been paid is electronically deposited into a linked investment account 835, in the event of a purchase of the virtual sword 840, the $5.00 of real-world financial consideration that was paid is electronically deposited into a linked investment account 845, and in the event of a purchase of the virtual battle axe 850, the $3.50 of real-world financial consideration that was paid is electronically deposited into a linked investment account 855. The amounts of the payments required for purchase of the one or more in-game items 820 made available for purchase at the in-game store 810 are solely for illustrative purposes only, and the amounts required for such purchases may be any suitable amounts as selected by the software company, account holder, gamer, or some combination of these persons or entities. Upon purchase and payment of the required amount of real-world financial consideration 825 and after electronic deposit of real-world financial consideration into the linked investment account 860, the amount of real-world financial consideration in the linked deposit account may be used in real-time, or at a time subsequent to the electronic deposit into the linked investment account 860, to make a purchase of a real-world financial product 865 that is to be held in a linked investment account, such as purchase of a certificate of deposit 870, purchase of a share of stock 880, or purchase of a bond 890. It should also be appreciated that it is not necessary that the entire amount of real-world financial consideration that is paid by the gamer for purchase of an in-game item 825 be deposited into a linked investment account 865. In some embodiments, such as discussed herein regarding FIG. 8B, part of the payment of real world financial consideration that is required for purchase of one or more in-game items 825 may be transferred to the software company (step not shown) as consideration for its work developing and marketing the computer game, with the remainder of the payment of the payment of real-world financial consideration being deposited into the linked investment account as shown 860 for subsequent purchase of one or more financial products 865. Thus, FIG. 8A is meant to illustrate a scenario of an embodiment, but the specific types of in-game items offered for purchase, the specific amounts of real-world financial consideration required to be paid for purchase of the in-game items, the specific amounts transferred into a linked investment account upon the purchase and payment for the in-game items, and the types of financial products purchased using the financial consideration that is transferred into the linked investment account are all optional and may vary depending upon programming choices made by the software company, choices made by a partnering investment or brokerage house, market fluctuations, the game account holder, or the gamer herself. Further, in certain instances the amount of real-world financial consideration that is electronically deposited into the linked investment account as a result of the purchase of an in-game item may be allowed to accumulate with other deposits prior to being used to purchase real-world financial products, depending on the requisite purchase price of the real-world financial products.

Figure 8B:
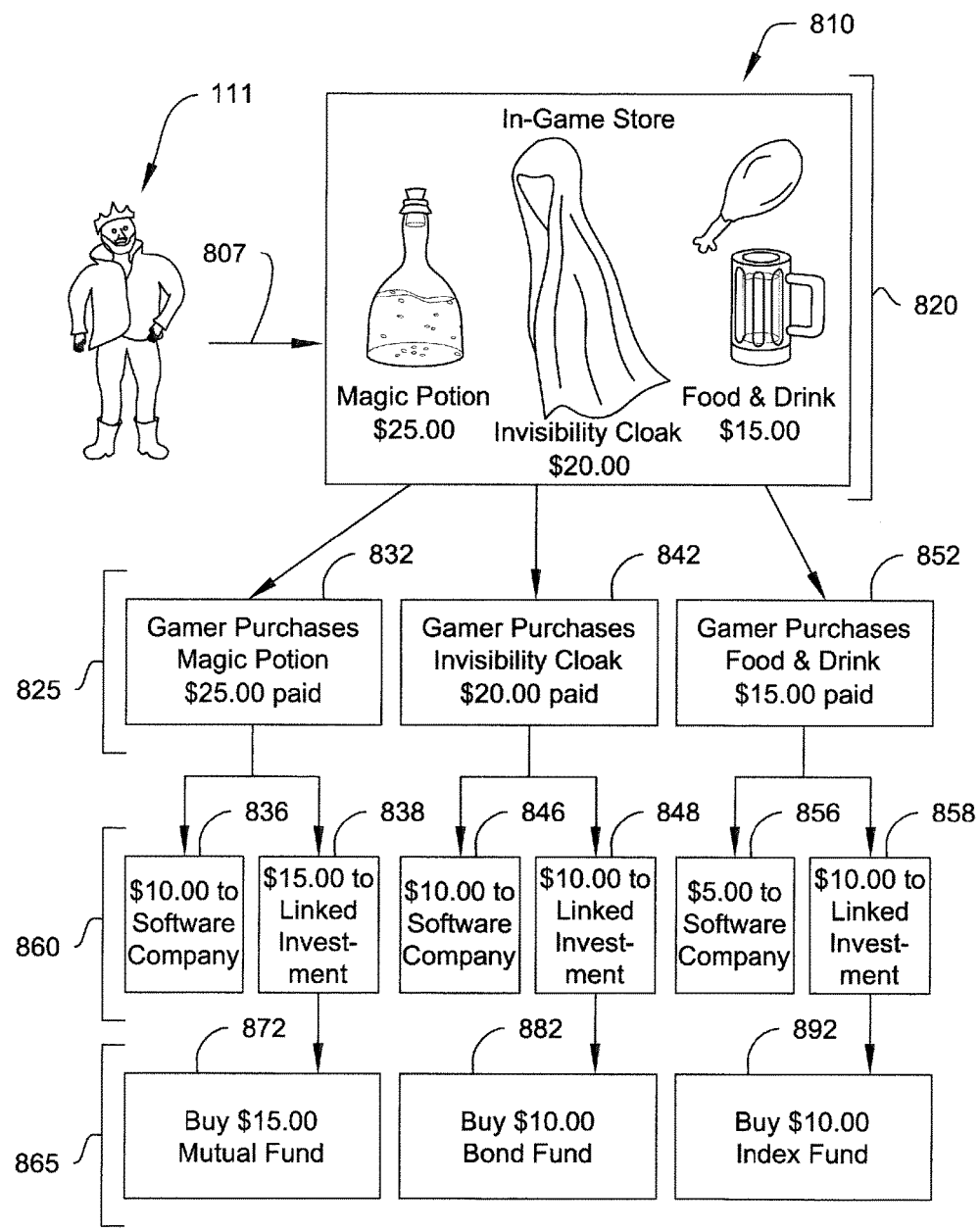
FIG. 8B illustrates an embodiment in which in-game items may be purchased by a gamer for use by the gamer's avatar by paying real-world funds with the result that part of the real-world funds paid are transferred to the software company and part of the real-world funds paid are transferred to a linked investment account where it is used to purchase financial products such as shares of stock, bonds, CDs.

FIG. 8B is an illustration of an alternate scenario of an embodiment in which the gamer's avatar 111 has an encounter 807 with an in-game store 810 within the virtual world of the computer game and the gamer has the opportunity to purchase one or more in-game items 820 that are offered for purchase for use by the gamer's avatar 111 in the virtual world of the game, wherein such potential purchase will require the gamer's payment of real-world financial consideration in exchange for the gamer's avatar 111 acquiring and being able to use the one or more in-game items 820 during game play within the virtual world of the computer game. In this example, the in-game items 820 that are offered for purchase are shown as a virtual magic potion offered for $25.00, virtual invisibility cloak offered for $20.00, and virtual food and drink offered for $15.00, but the type of in-game items 820 shown in this illustration are for illustrative purposes and the in-game items 820 offered for purchase may be any type or kind of virtual object for which the gamer would be required to pay real-world financial consideration in exchange for the avatar 111 acquiring and being able to use the in-game item 820 within the virtual world of the computer game. In this example scenario, the gamer may take the step of purchasing 825 the one or more in-game items 820 that are offered for purchase in the in-game store 810, for example, the gamer may purchase the virtual magic potion by paying the required $25.00 of real-world consideration 832, the gamer may purchase the virtual invisibility cloak by paying the $20.00 of real-world consideration 842, or the gamer may purchase the virtual food and drink by paying the $15.00 of real-world consideration 852. In this scenario, as distinguished from the scenario illustrated in FIG. 8A, the gamer's required payment of real-world financial consideration during the purchase 825 then goes through a bifurcation step in which a portion of the payment of real-world financial consideration is transferred to the software company as its consideration for developing and marketing the computer game, while the remainder of the payment real-world financial consideration is deposited into a linked investment account. For instance, if the gamer purchases the virtual magic potion and pays a total of $25.00 for the purchase 832, $10.00 of the payment made by the garner will be transferred to the software company 836, and the remaining $15.00 will be electronically deposited into a linked investment account 837, where it may be subsequently used to make a purchase of a financial product 865, for example, shares of a mutual fund 872. In this example, if the gamer purchases the virtual invisibility cloak and pays a total of $20.00 for the purchase 842, $10.00 of the payment will be transferred to the software company 846 and the remaining $10.00 will be transferred to a linked investment account 848, where it may be used to purchase a financial product 865, for example, shares of a bond fund 882. In this example, if the gamer purchases the virtual food and drink and pays a total of $15.00 for the purchase 852, $5.00 of the payment will go to the software company 856, and the remaining $10.00 will be electronically deposited into a linked investment account 858, where it may be used to purchase a financial product 865, for example, shares of an index fund 892. FIG. 8B is meant to illustrate a scenario of an embodiment, but the specific types of in-game items, the specific purchase amounts required to be paid for purchase of the in-game items, the specific amounts transferred to the software company versus the amounts transferred into the linked investment accounts upon purchase of the in-game items, and the types of financial products purchased using the financial consideration that is transferred into the linked investment account are all optional and may vary depending upon programming choices made by the software company, choices made by partnering investment or brokerage houses, market fluctuations, the game account holder, the gamer herself, or a combination of these persons and entities.

Figure 9A:
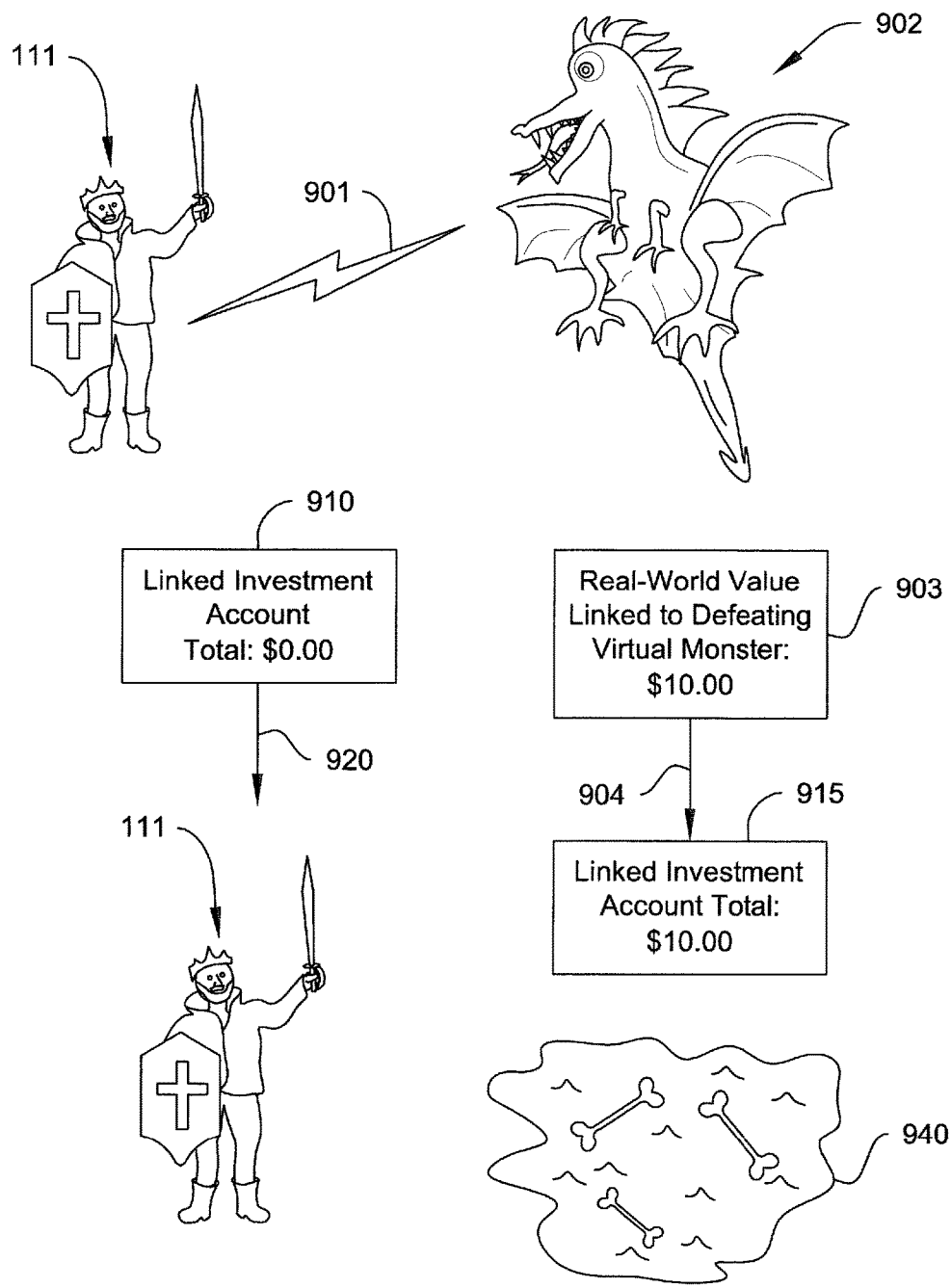
FIG. 9A illustrates an embodiment in which the gamer's avatar encounters an in-game challenge and must engage in virtual combat to slay a virtual monster and whereby successfully accomplishing such in-game challenge results in real world financial value being transferred into a linked investment account.

FIG. 9A illustrates an embodiment involving an in-game challenge in which the gamer's avatar 111 has an encounter 901 with a virtual monster 902 within the virtual world of the computer game. Although not necessarily shown as part of the audiovisual display of the virtual world provided by the client system used by the gamer to play the computer game, the game software or game logic keeps track of the amount of real-world value in the linked investment account such that there is a first linked investment account total 910 that exists immediately prior to the in-game challenge, in this instance, an encounter 901 between the avatar 111 and the virtual monster 902. Furthermore, prior to the encounter 901 between avatar 111 and virtual monster 902, an amount of real-world currency is linked to potential successful completion of the in-game challenge 903, in this example, defeating the virtual monster 902 in virtual combat. The linking of an amount of real-world currency to successful completion of the in-game challenge 903 is a function of the game software or game logic. Assuming that a combat between the avatar 111 and the virtual monster 902 occurs (not illustrated) and leads to a change in game state 920 wherein the avatar 111 is victorious and the virtual monster 902 has been defeated 940, the amount of real-world currency that is linked to potential successful completion of the in-game challenge 903, in this example, the defeat of the virtual monster 940, is electronically transferred 904 into a linked investment account 915 as a function of the game software or game logic. Although FIG. 9 shows an illustration of an embodiment in which potential successful completion of an in-game challenge, for example defeating a virtual monster through combat, is linked to an amount of real-world currency that will be transferred into a linked investment account upon the defeat of the virtual monster by the gamer's in-game avatar, an in-game challenge need not involve combat or the potential defeat of an in-game monster or opponent. The in-game challenge can take on many different forms, including moving the avatar through the virtual world to search for and find hidden or disguised in-game items, solving puzzles, completing in-game quests or missions, and many other types of in-game challenges. As with the other embodiments, once the real-world currency is in the linked investment account, it may be used to purchase financial products.

Figure 9B:
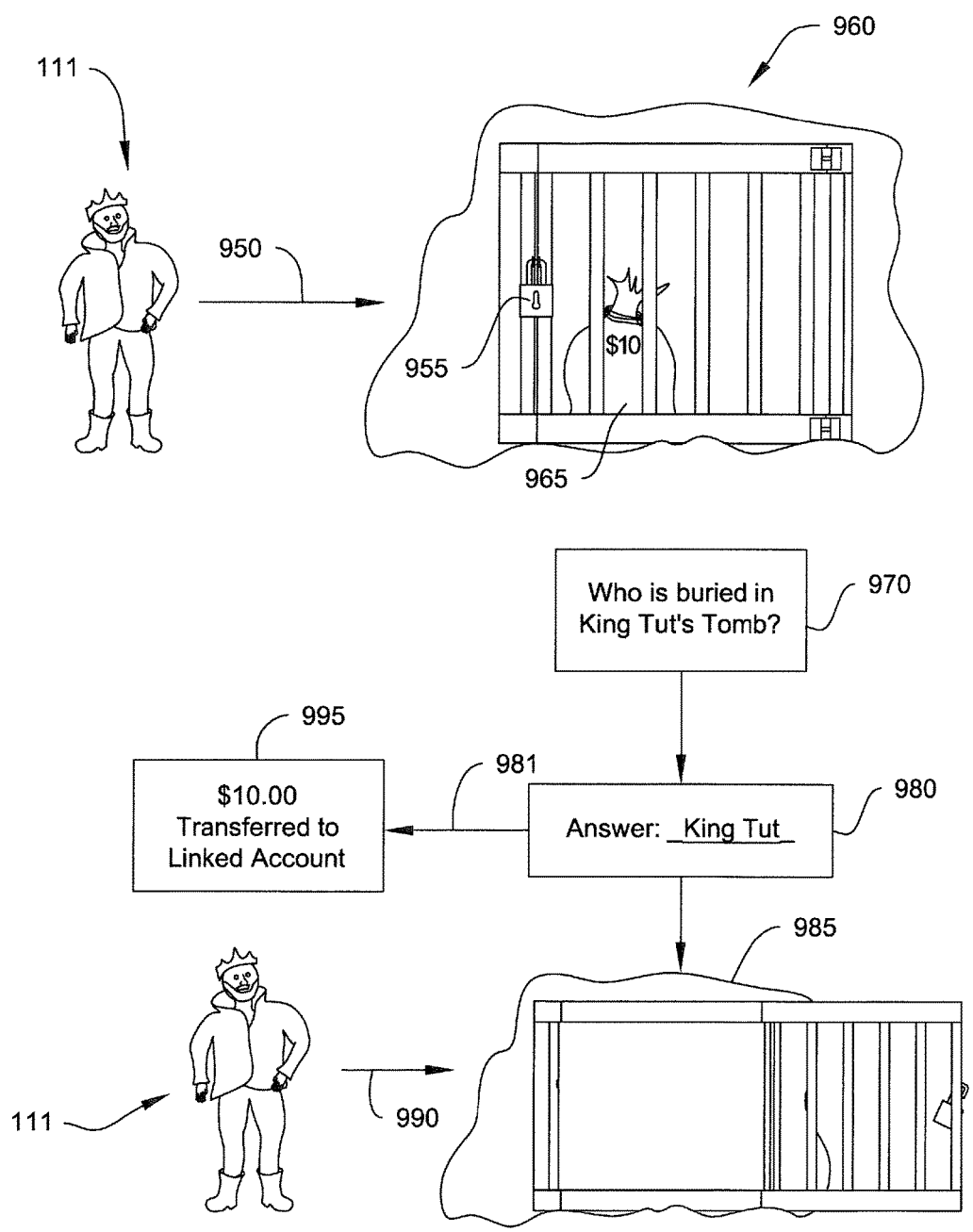
FIG. 9B illustrates an embodiment in which a gainer's avatar encounters an in-game challenge involving solving a riddle in exchange for an in-game reward and that also triggers a transfer of real world financial value to a linked investment account.

FIG. 9B illustrates an alternate embodiment involving an in-game challenge in which the gamer's avatar 111 has an encounter 950 with a locked gate 955 preventing entrance into a virtual cave 960 within which is located a bag of loot 965 that is linked to $10.00 in real-world currency. The avatar 111, the cave 960, the locked gate 955 and the bag of loot 965 are all virtual and all exist within the virtual world of the computer game. The amount of real-world currency that is linked to the bag of loot 965 may or may not be displayed on by the audiovisual display of the client system with regard to the bag of loot 965, but the amount of real-world currency is linked to the bag of loot 965 as a function of the game software or game logic. In this embodiment, the in-game challenge is in the form of a question 970 that must be successfully answered in order to unlock the locked gate 955 and obtain the bag of loot 965. The gamer is required to provide an answer to the question, and if the gamer provides the correct answer to the question 980, the locked gate 955 will be opened 985 such that the gamer's avatar 111 may move into 990 the cave 960 and collect the bag of loot 965. Either contemporaneously with the correct answer being provided by the garner 980, or upon the avatar 111 entering the cave 960 and collecting the bag of loot 965, the amount of real-world currency linked to the bag of loot 965 is transferred 981 to the linked investment account 995. Thus, prior to the encounter 950 between avatar 111 and the in-game challenge, in this example a locked gate 955 at the entrance of the cave 960 requiring an answer to a question 970, an amount of real-world currency is linked to potential successful completion of the in-game challenge, in this instance, unlocking the locked gate 960 by providing a correct answer 980 to the question 970 in order for the avatar 111 to obtain access to the bag of loot 965. The linking of an amount of real-world currency to successful completion of the in-game challenge is a function of the game software or game logic. In the event of successful completion of the in-game challenge, in this example, providing the correct answer and unlocking the gate, the linked amount of real-world currency is electronically transferred into a linked investment account as a function of the game software or game logic. Although FIG. 9A shows an illustration of one scenario of an embodiment in which potential successful completion of an in-game challenge, namely correctly answering a question posed to the player by the computer game, is linked to an amount of real-world currency that will be transferred into a linked investment account upon the successful completion of the in-game challenge, an in-game challenge need not involve successfully answering questions or riddles as shown in FIG. 9B. The in-game challenge can take on many different forms, including moving the avatar through the virtual world to search for and find hidden or disguised in-game items, solving puzzles, completing in-game quests or missions, successfully defeating virtual monsters or virtual challengers, winning in virtual combat with avatars controlled by other players, and many other types of in-game challenges.

Figure 10:
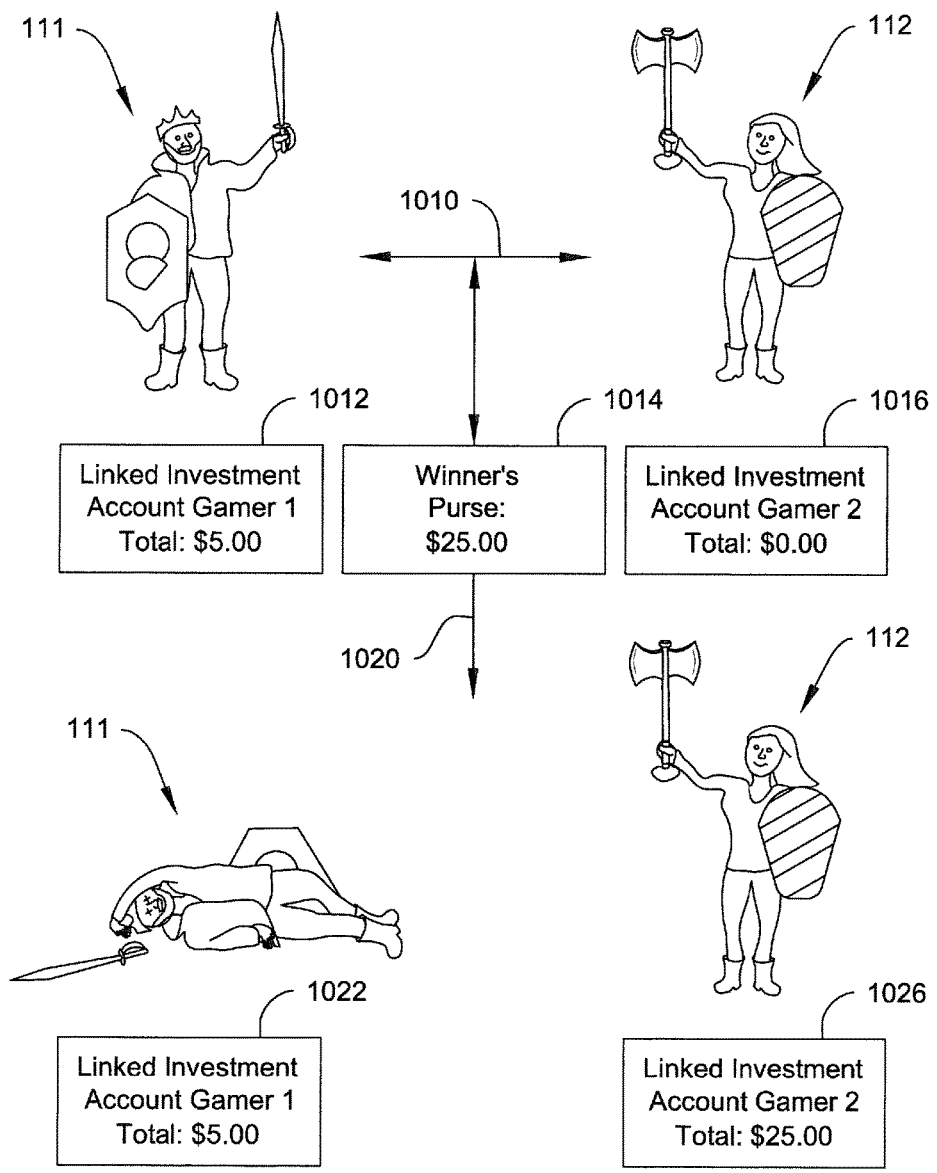
FIG. 10 illustrates an embodiment in which a gamer's avatar encounters a second gamer's avatar and there is an in-game challenge in the form of virtual combat between the two avatars resulting in the first gamer losing the virtual combat and the second gamer winning the virtual combat which triggers a transfer of real world funds into the second gamer's linked investment account.

FIG. 10 illustrates an embodiment involving an in-game challenge in which the gamer's avatar 111 becomes engaged in virtual combat 1010 with a second gamer's avatar 112 within the the virtual world of the computer game. Although not necessarily shown as part of the audiovisual display of the virtual world provided by the client system to the gamer that is used to play the computer game, game software or game logic records and keeps track of the amount of real-world value in each of the garners' linked investment accounts such that there is a first linked investment account with a first amount of real-world value associated with the gamer 1012 and a second linked investment account with a second amount of real-world value that is associated with the second gamer 1016, each of which linked investment accounts 1012, 1016 contain an initial total amount of real-world value prior to the virtual combat 1010. Furthermore, prior to the initiation of the virtual combat 1010, an amount of real-world currency is linked to potential victory in the virtual combat 1014, in this instance, the amount of real-world currency linked to potential victory in the virtual combat 1014 is $25.00. The linking of an amount of real-world currency to potential victory in the virtual combat 1014 is a function of the game software or game logic. Assuming that a combat between the gamer's avatar 111 and the second gamer's avatar 112 occurs (not illustrated) and leads to a change in game state 1020 wherein the second gamer's avatar 112 is victorious and the gamer's avatar 111 has been defeated, the amount of real-world currency that is linked to potential victory in the combat 1014, in this instance $25.00, is electronically transferred into the second linked investment account that will now contain a new total amount of real-world value 1026, and this transfer will occur as a function of the game software or game logic, while no amount of real-world currency is transferred into the first linked investment account such that the new total of the real-world value contained within the first linked investment account 1022 remains the same as the previous total 1012 because the gamer's avatar was defeated in the virtual combat 1010 within the virtual world of the game. Although FIG. 10 shows an illustration of an embodiment in which successful completion of an in-game challenge, namely defeating another gamer's avatar, is linked to an amount of real-world currency that is transferred into the linked investment account of the successful combatant upon victory in virtual combat, an in-game challenge need not involve combat or the potential defeat of an opponent. The in-game challenge can take on many different forms, including moving the avatar through the virtual world to search for and find hidden or disguised in-game items, solving puzzles or riddles, defeating virtual opponents or monsters generated and controlled by the computer game, completing in-game quests or missions, and many other types of in-game challenges.

It should be understood that the above-described embodiments of the invention are not intended to limit the scope of the invention, but merely to illustrate specific embodiments of the invention as envisioned by the inventors at the time of filing of their application for patent.

What we claim is:

1. A computer game system allowing for a player to play an interactive online computer game that also facilitates financial investment as a secondary benefit of game play comprised of:

One or more game servers in communication with one or more client systems over a network that cooperate to accomplish the functions of the interactive online computer game that are involved in a player playing the computer game, including the creation and display of a virtual world of the computer game to the player through a user interface of the client system, receiving game play input from the player through the client system during game play, processing the game play input provided by the player and determining appropriate game play output in response to the game play input by means of game play program instructions stored in non-transitory memory of the computer game system, and display of the game play output to the player by means of the user interface;

At least one avatar that is displayed by the user interface as existing within the virtual world of the computer game, wherein the avatar may be controlled by game play input of the player provided to the computer game system through a client system, and wherein the avatar may move and act within the virtual world of the computer game as a result of processing of game play input provided by the player through the client system and processing of that game play input by the computer game system;

At least one in-game item that is a virtual object generated by the computer game system that is displayed by the user interface as existing within the virtual world of the computer game, wherein the player may provide game play input to the computer game system that results in movement or other action of the avatar within the virtual world of the computer game such that the avatar collects or acquires the in-game item within the virtual world of the computer game;

A game account that is an electronic account that must be set-up prior to initiation of online game play of the computer game based on identifying game account information that is provided to the computer game system through a client system and stored in non-transitory memory of the computer game system, wherein such a game account must be used by a player in order to access and play the online interactive computer game;

Account payment program instructions that are program instructions stored in non-transitory memory of the computer game system that require the making of at least one payment of real-world financial consideration with regard to a game account in exchange for the ability of a player to use the game account to access and play the interactive online computer game on the computer game system;

A linked investment account that is a financial investment account that is capable of receiving electronic transfers of real-world financial consideration and is either directly linked to a game account or linked by means of a network to a game account;

Value allocation program instructions that are program instructions stored in non-transitory memory of the computer game system that intercept the said at least one payment of real-world financial consideration that is made with regard to the game account and allocate a portion of the intercepted real-world financial consideration to at least one in-game item such that the at least one in-game item is linked by means of program instructions to the allocated portion of real-world financial consideration;

Account transfer program instructions that are program instructions stored in non-transitory memory of the computer game system that initiate an electronic transfer of the portion of real-world financial consideration allocated to the at least one in-game item to a linked investment account upon the collection or acquisition of the at least one in-game item by a player's avatar within the virtual world of the computer game; and wherein the value allocation program instructions intercept the at least one payment of real world financial consideration and allocate a portion of the intercepted real-world financial consideration among a plurality of in-game items such that the total amount of real-world financial consideration allocated among the plurality of in-game items may be incrementally transferred to the linked investment account as the player's avatar collects or acquires the plurality of in-game items during game play.

2. The computer game system of claim 1 wherein the in-game items are in-game value items that are icons or virtual representations of real-world items that have real-world financial value.

3. The computer game system of claim 1 wherein the in-game items are virtual objects that may be used by a player's avatar within the virtual world of the computer game during game play in order to complete in-game challenges.

4. The computer game system of claim 1 wherein the payment of real-world consideration with regard to a game account is in the form of a periodic subscription payment that is required in order to maintain the game account in good standing such that the game account may continue to be used to obtain access and to play the online interactive computer game.

5. The computer game systems of claim 4 wherein the periodic subscription payment is in the form of an electronic debit transaction, electronic credit transaction, or electronic transfer of real-world financial consideration from an electronic payment account.

6. The computer game system of claim 5 wherein upon the receipt of each periodic subscription payment, additional amounts of real world financial consideration are allocated among in-game items by the value allocation program instructions such that additional incremental transfers of real world financial consideration into the linked investment account are made possible and will be initiated by the account transfer program instructions upon the collection or acquisition of the in-game items by the player's avatar.

7. A computer game system allowing for a player to play an interactive online computer game that also facilitates financial investment as a secondary benefit of game play comprised of:

One or more game servers in communication with one or more client systems over a network that cooperate to accomplish the functions of the interactive online computer game that are involved in a player playing the computer game, including the creation and display of a virtual world of the computer game to the player through a user interface of the client system, receiving game play input from the player through the client system during game play, processing the game play input provided by the player and determining appropriate game play output in response to the game play input by means of game play program instructions stored in non-transitory memory of the computer game system, and display of the game play output to the player by means of the user interface;

At least one avatar that is displayed by the user interface as existing within the virtual world of the computer game, wherein the avatar may be controlled by game play input of the player provided to the computer game system through a client system, and wherein the avatar may move and act within the virtual world of the computer game as a result of processing of game play input provided by the player through the client system and processing of that game play input by the computer game system;

At least one in-game challenge that is generated by the computer game system and displayed by the user interface as existing within the virtual world of the computer game, wherein the player may provide game play input to the computer game system that results in movement or other action of the avatar within the virtual world of the computer game such that the avatar completes the in-game challenge within the virtual world of the computer game;

A game account that is an electronic account that must be set-up prior to initiation of online game play of the computer game based on identifying game account information that is provided to the computer game system through a client system and stored in non-transitory memory of the computer game system, wherein such a game account must be used by a player in order to access and play the online interactive computer game;

Account payment program instructions that are program instructions stored in non-transitory memory of the computer game system that require the making of at least one payment of real-world financial consideration with regard to a game account in exchange for the ability of a player to use the game account to access and play the interactive online computer game on the computer game system;

A linked investment account that is a financial investment account that is capable of receiving electronic transfers of real-world financial consideration and is either directly linked to a game account or linked by means of a network to a game account;

Value allocation program instructions that are program instructions stored in non-transitory memory of the computer game system that intercept the said at least one payment of real-world financial consideration that is made with regard to the game account and allocate a portion of the intercepted real-world financial consideration to at least one in-game challenge such that the at least one in-game challenge is linked by means of program instructions to the allocated portion of real-world financial consideration;

Account transfer program instructions that are program instructions stored in non-transitory memory of the computer game system that initiate an electronic transfer of the portion of real-world financial consideration allocated to the at least one in-game challenge to a linked investment account upon the completion of the at least one in-game challenge by a player's avatar within the virtual world of the computer game; and wherein the value allocation program instructions intercept the at least one payment of real world financial consideration and allocate a portion of the intercepted real-world financial consideration among a plurality of in-game challenges such that the total amount of real-world financial consideration allocated among the plurality of in-game challenges may be incrementally transferred to the linked investment account as the player's avatar completes the plurality of in-game challenges during game play.

8. The computer game system of claim 7 wherein at least one of the in-game challenges is presented in the form of virtual combat between the player's avatar and an in-game opponent that is generated and controlled by the game play program instructions such that the virtual combat occurs within the virtual world of the computer game.

9. The computer game system of claim 7 wherein at least one of the in-game challenges is presented in the form of virtual combat between the player's avatar and an avatar controlled by a second player such that the virtual combat occurs within the virtual world of the computer game.

10. The computer game system of claim 7 wherein at least one of the in-game challenges is presented in the form of a maze, puzzle, or riddle that must be solved by the player through appropriate input into a client system resulting in the solving or completion of the maze, puzzle, or riddle.

11. The computer game system of claim 7 wherein at least one of the in-game challenges is presented in the form of a mission, quest, or task that must be completed by the player through appropriate input into a client system resulting in completion of the mission, quest, or task.

12. The computer game system of claim 7 wherein at least one of the in-game challenges is presented in the form of the requirement that the player use her avatar to find, collect, or acquire certain in-game items within the virtual world of the computer game.

13. The computer game system of claim 7 wherein the payment of real-world consideration with regard to a game account is in the form of a periodic subscription payment that is required in order to maintain the game account in good standing such that the game account may continue to be used to obtain access and to play the online interactive computer game.

14. The computer game systems of claim 13 wherein the periodic subscription payment is in the form of an electronic debit transaction, electronic credit transaction, or electronic transfer of real-world financial consideration from an electronic payment account.

15. The computer game system of claim 14 wherein upon the receipt of each periodic subscription payment, additional amounts of real world financial consideration are allocated among in-game challenges by the value allocation program instructions such that additional incremental transfers of real world financial consideration into the linked investment account are made possible and will be initiated by the account transfer program instructions upon the completion of the in-game challenges by the player's avatar.

* * * * *